(12) United States Patent
Fettweis et al.

(10) Patent No.: US 8,428,171 B2
(45) Date of Patent: Apr. 23, 2013

(54) METHOD FOR APPROXIMATING AND OPTIMIZING GAINS IN CAPACITY AND COVERAGE RESULTING FROM DEPLOYMENT OF MULTI-ANTENNAS IN CELLULAR RADIO NETWORKS

(75) Inventors: Gerhard Fettweis, Dresden (DE); Jens Voigt, Dresden (DE); Joerg Schueler, Dresden (DE)

(73) Assignee: Actix GmbH, Dresden (DE)

( * ) Notice: Subject to any disclaimer, the term of this patent is extended or adjusted under 35 U.S.C. 154(b) by 516 days.

(21) Appl. No.: 12/724,746

(22) Filed: Mar. 16, 2010

(65) Prior Publication Data

US 2010/0232529 A1 Sep. 16, 2010

(30) Foreign Application Priority Data

Mar. 16, 2009 (EP) ..................................... 09155250

(51) Int. Cl.
*H04B 7/02* (2006.01)
*H04L 1/02* (2006.01)
(52) U.S. Cl.
USPC .......................................... 375/267; 375/260
(58) Field of Classification Search .................. 375/260, 375/267
See application file for complete search history.

(56) References Cited

U.S. PATENT DOCUMENTS

| | | | |
|---|---|---|---|
| 6,317,599 B1* | 11/2001 | Rappaport et al. | 455/446 |
| 7,962,102 B2* | 6/2011 | Corral et al. | 455/67.16 |
| 2003/0147353 A1* | 8/2003 | Clarkson et al. | 370/252 |
| 2004/0259554 A1* | 12/2004 | Rappaport et al. | 455/446 |
| 2005/0179591 A1* | 8/2005 | Bertoni et al. | 342/453 |
| 2006/0019679 A1* | 1/2006 | Rappaport et al. | 455/456.5 |
| 2007/0019769 A1* | 1/2007 | Green et al. | 375/360 |
| 2007/0225041 A1* | 9/2007 | Bi et al. | 455/562.1 |
| 2008/0113626 A1* | 5/2008 | Kim et al. | 455/69 |

OTHER PUBLICATIONS

Wagen, J., "Radiowave Propagation, Building Databases, and GIS: Anything in Common? A Radio Engineer's Viewpoint", May 2003, Environment and Planning B: Planning and Design 2003, vol. 30, p. 767-787.*
V.R. Anreddy and M.A. Ingram, "Antenna Selection for Compact Dual-Polarized MIMO Systems With Linear Receivers", 49th IEEE Global Telecommunications Conference, San Francisco, CA, USA, Dec. 2006.
A. Dua, K. Medepalli, J.A. Paulraj, "Receive Antenna Selection in MIMO Systems Using Convex Optimization", IEEE Transactions on Wireless Communications, vol. 5, Issue 9, pp. 2353-2357, Sep. 2006.
A. Molisch, "Effect of Far Scatterer Clusters in MIMO Outdoor Channels Models", IEEE VTC Spring, Jeju, So. Korea, Apr. 2003.
I. Riedel, R. Habendorf, E. Zimmermann, and G. Fettweis, "Multiuser Transmission in Cellular Systems With Different Sector Configurations", IEEE VTC Fall, Calgary, AB, Canada, Sep. 2008.

* cited by examiner

Primary Examiner — Shuwang Liu
Assistant Examiner — Sung Anh
(74) Attorney, Agent, or Firm — Heslin Rothenberg Farley & Mesiti P.C.

(57) ABSTRACT

A method is provided for planning and optimizing the configuration of a radio access network which comprises base stations and receivers and employs a mobile radio technology that allows and/or enforces use of multi-antenna types at said base stations and receivers. By a ray tracing algorithm which is performed between said transmitter positions and said receiver positions using a 3D clutter height matrix, a scalar metric is determined for each receiver position which directly reflects a capacity gain resulting from applying a multi-antenna type instead of a single antenna at said transmitter and receiver positions. This scalar metric allows in an algorithmically advantageous way to analyze the relative performance of different MIMO antenna types in a potential deployment area and to select and deploy an optimal MIMO antenna type for a particular coverage sector.

21 Claims, 14 Drawing Sheets

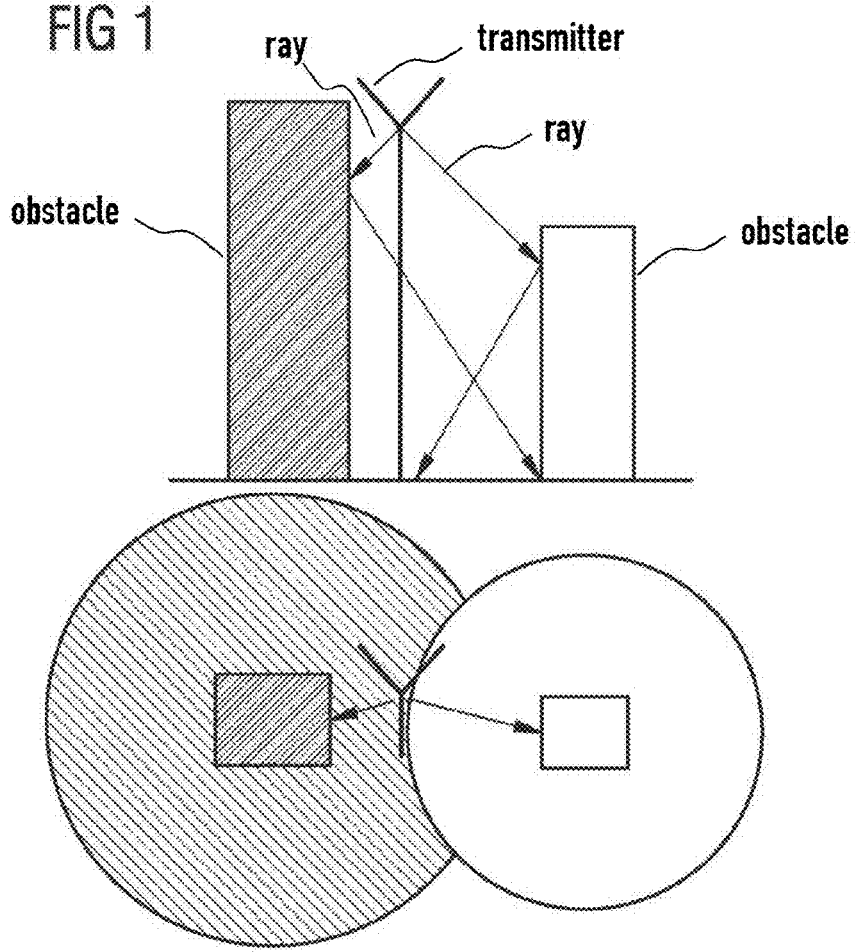
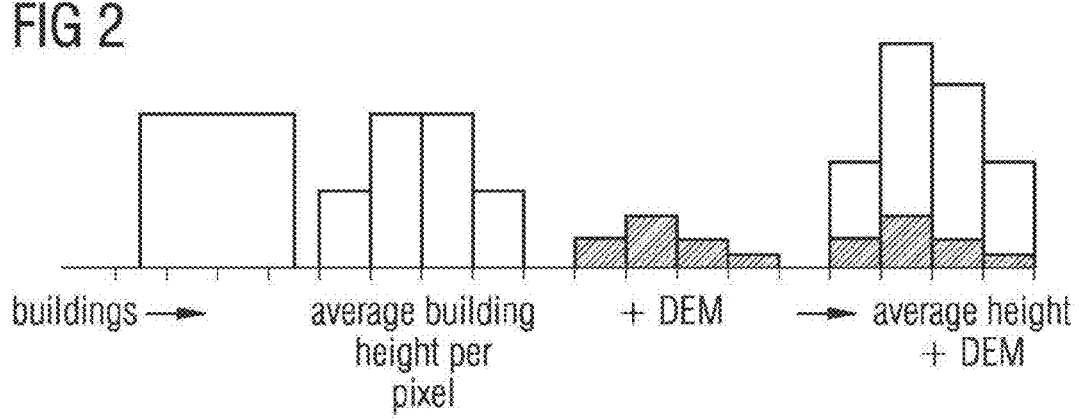

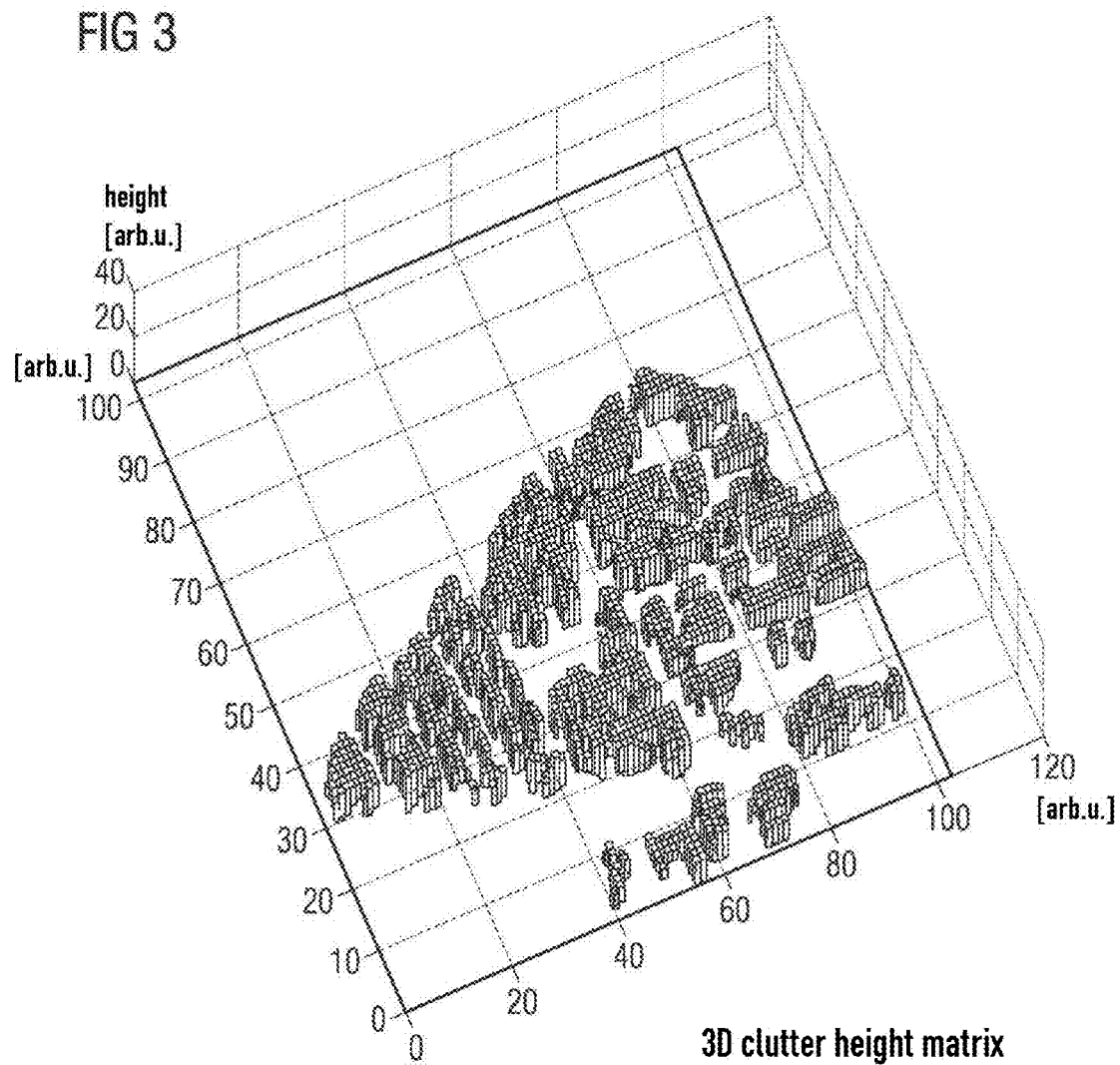

directional diagram of ULA consisting of two single antenna elements

ULA of two single antenna elements derived spatial bins

ULA of two single antenna elements

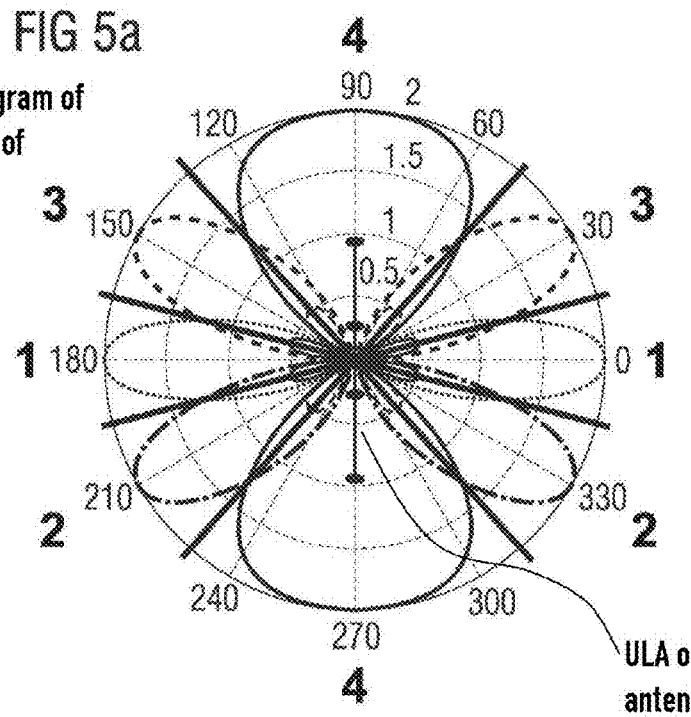
FIG 5a  directional diagram of ULA consisting of four single antenna elements
ULA of four single antenna elements
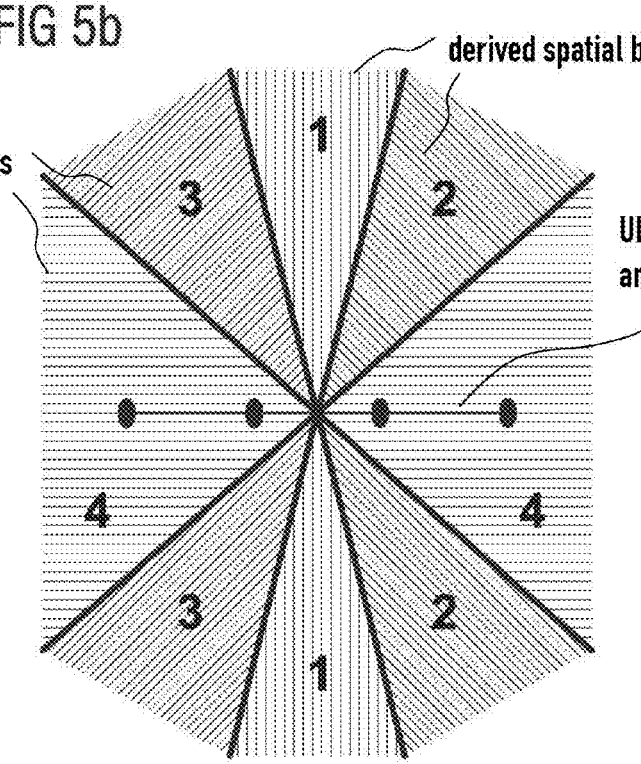
FIG 5b
derived spatial bins
derived spatial bins
ULA of four single antenna elements directional diagram of 65° sector antenna sector antenna sector antenna derived spatial bin directional diagram of ULA consisting of two 65° sector antennas ULA of two sector antennas derived spatial bins ULA of two sector antennas directional diagram of ULA consisting of four 65° sector antennas ULA of four sector antennas derived spatial bins derived spatial bins ULA of four sector antennas

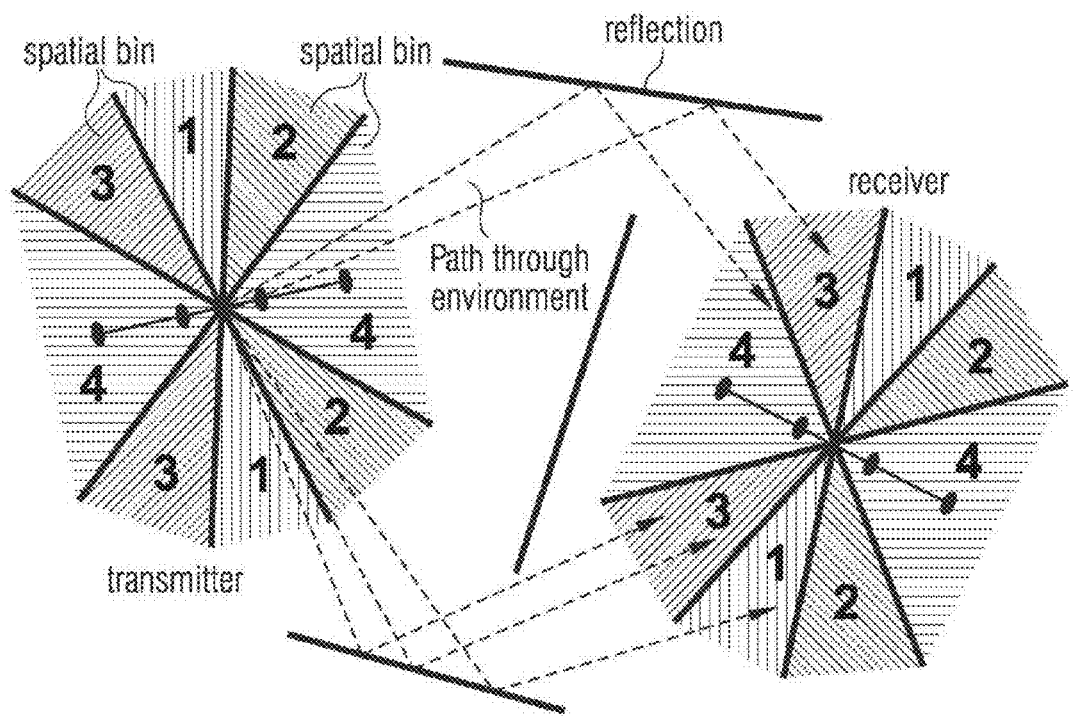
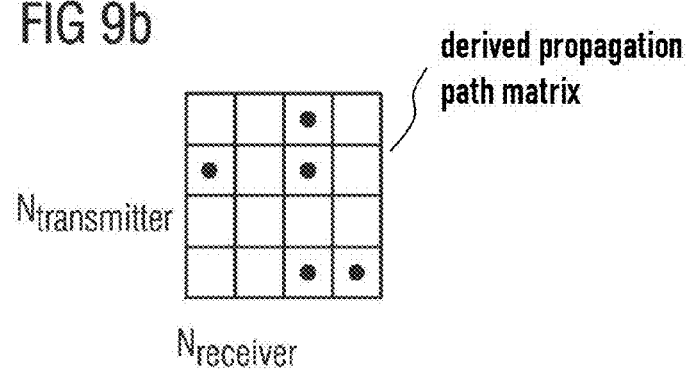

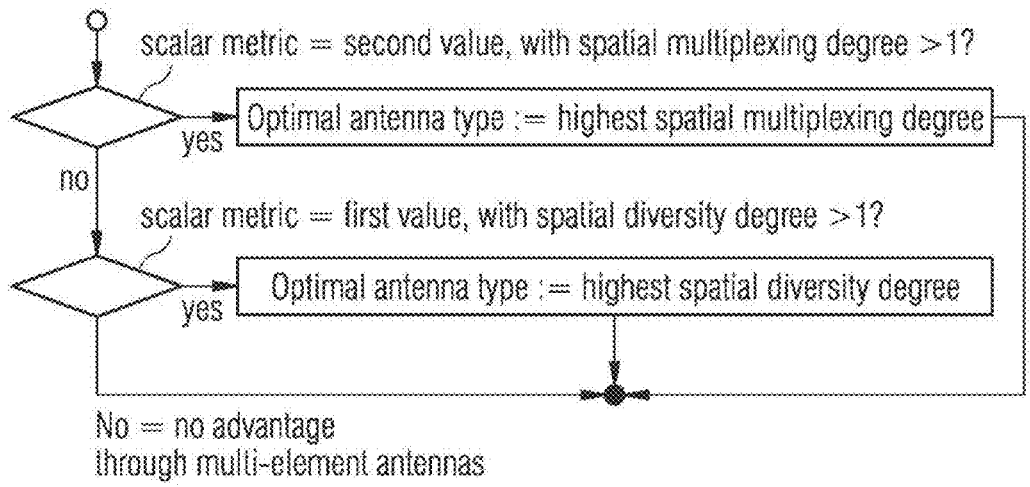
FIG 12a
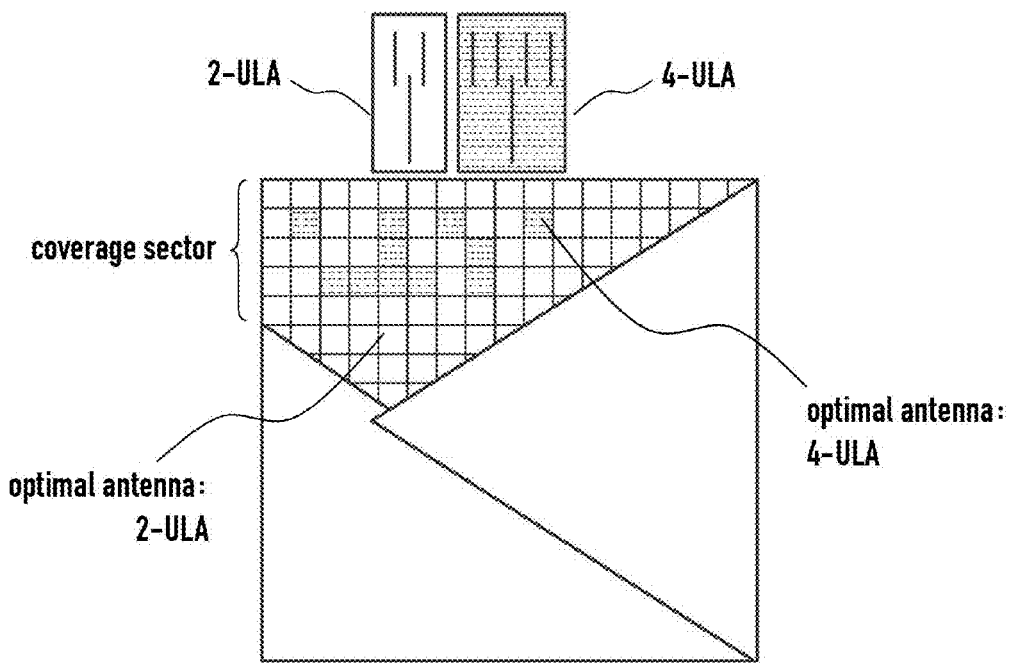
FIG 12b   2-ULA vs. 4-ULR

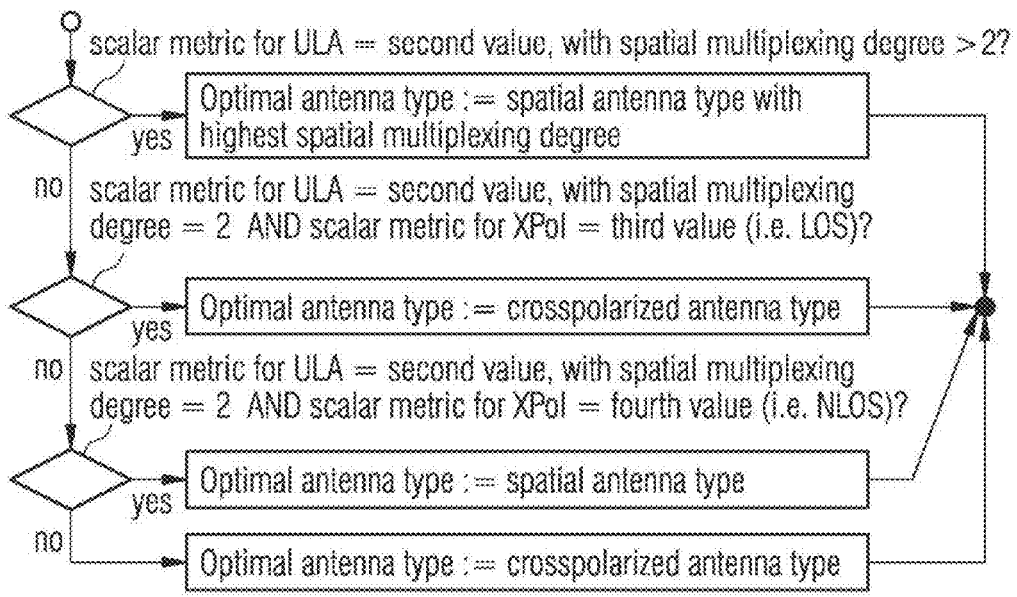
FIG 13a
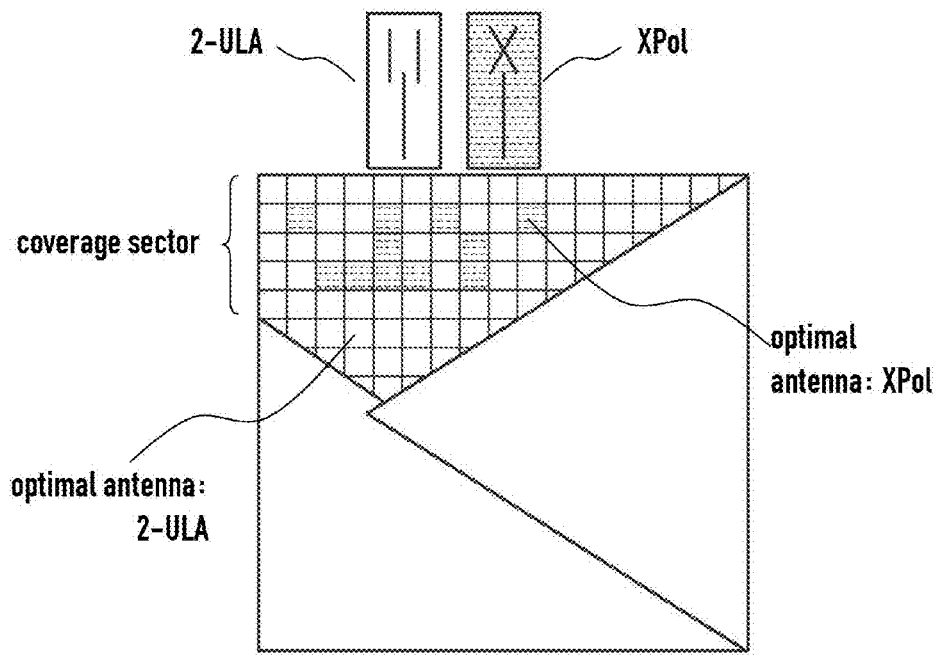
FIG 13b  2-ULA vs. XPol

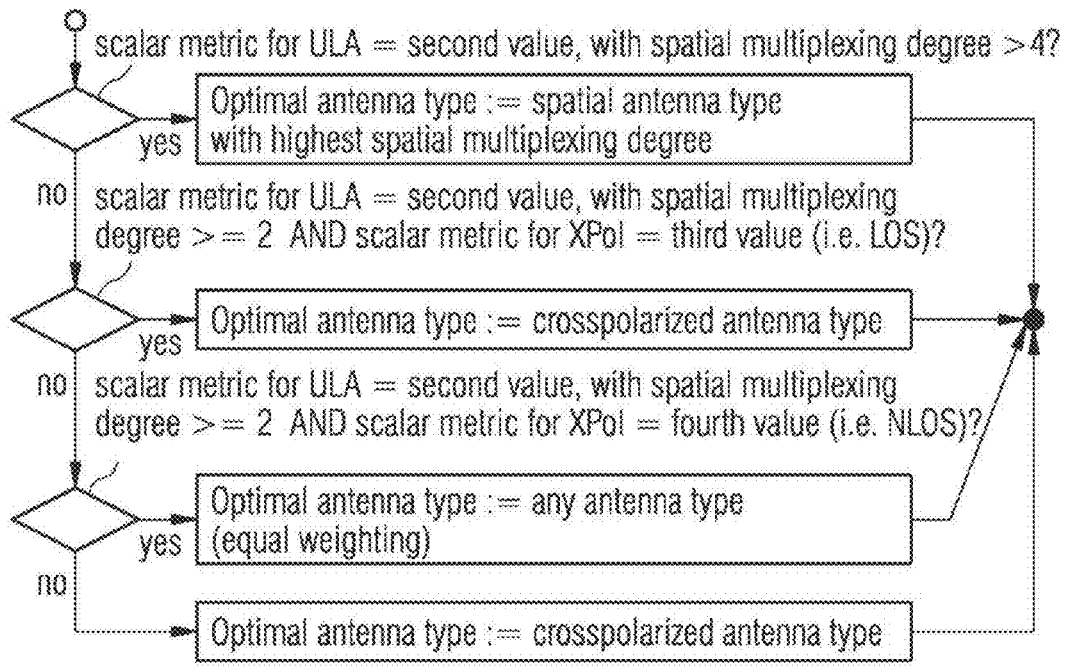
FIG 14a
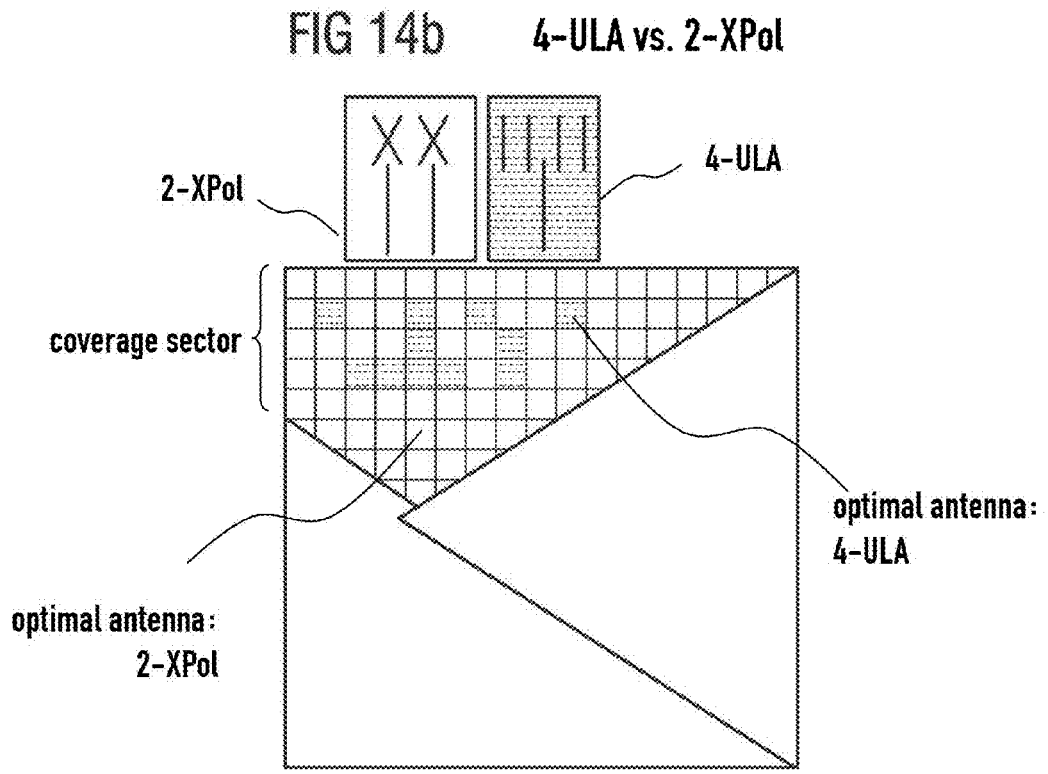
FIG 14b  4-ULA vs. 2-XPol

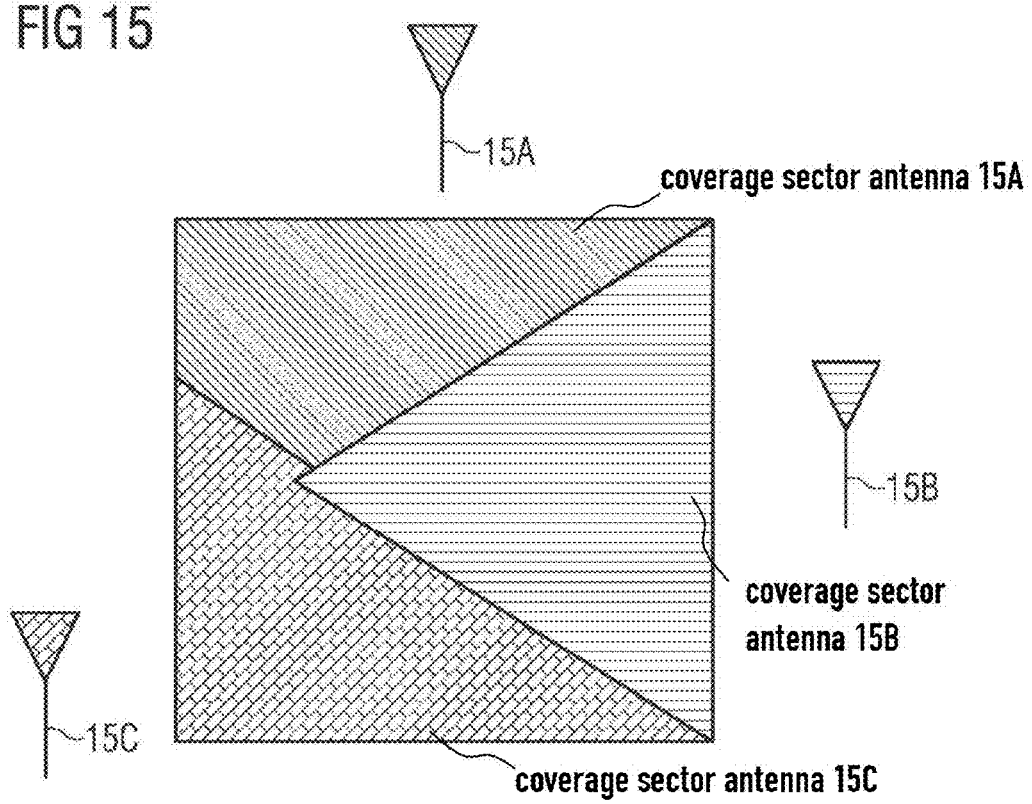

METHOD FOR APPROXIMATING AND OPTIMIZING GAINS IN CAPACITY AND COVERAGE RESULTING FROM DEPLOYMENT OF MULTI-ANTENNAS IN CELLULAR RADIO NETWORKS

CROSS REFERENCE TO RELATED APPLICATIONS

This application claims priority of European patent application EP 09 155 250.5 filed on Mar. 16, 2009, the entire contents of which is hereby incorporated by reference herein.

FIELD OF THE INVENTION

The invention relates to a method for planning and optimizing the configuration of a radio access network which comprises base stations and receivers and employs a mobile radio technology that allows and/or enforces use of multi-antenna types at said base stations and receivers. In particular, the invention relates to a method for estimating advantages that can be obtained in case of deployment of multi-antennas in radio access networks, selecting an optimal multi-antenna type or configuration, and then physically deploying the optimal multi-antenna type or configuration in the actual radio access network.

BACKGROUND OF THE INVENTION

Multiple-Input Multiple-Output (MIMO) technology is ready for deployment in the near future. A variety of MIMO antenna types including cross-polarized antennas, uniform linear arrays, and remote radio heads will be available. While theoretical MIMO performance gains have thoroughly been investigated, one of the major tasks of network operators, the selection process of an optimal MIMO antenna type for every sector in cellular network planning and optimization workflows, has rarely been treated so far.

MIMO technology is specified by the 3GPP in Release 7 for HSPA+ and with even more options in Release 8 for LTE. Currently, network operators strongly ask for solutions that embed MIMO technology into the process of planning and optimization of cellular network deployments.

Planning and optimization of radio access networks of cellular radio networks comprises to define the configuration of the radio access network in terms of the number of base stations in a coverage area, the number of sectors per base station, the position of the base stations, the type of the antennas per base station sector, the orientation of the antennas in tilt and azimuth, the transmit power of base stations/sectors. This is conventionally done by evaluating the physical metrics of 'coverage' and 'capacity'.

Also, non-physical metrics can be used for deployment or optimization of the radio access network, for example balancing of the dissipated traffic per sector, the predicted traffic volume per sector, the maximum predictable cost and/or revenue, and the like.

While radio access network planning provides a first functional configuration, optimization of a radio access network defines an optimum configuration. Optimization of a radio access network configuration aims at enhancing the metrics mentioned above in the concerned area and/or especially for areas of high traffic density. A typical optimization task is also the selection of an optimum position for a base station from a set of candidate positions, known as site selection, or the integration of base stations into an existing network of base stations which is known as site integration. A radio access network, here, is to be understood as the radio network relevant part of a cellular radio network.

The physical metric 'coverage', is commonly expressed as a logarithmic measure of the receive field strength of pilot or reference signals of the respective mobile radio technology which is to be planned or optimized. The receive field strength is calculated from the transmit power of the transmitters and the attenuation of the radio channel between transmitter and receiver positions which is referred to as 'path attenuation', gains of transmit and receive antennas, and optionally from further gains or losses in the hardware of the transmitters and receivers.

The physical metric 'capacity' of a cellular radio technology which does not employ multi-antenna types, is commonly expressed as a logarithmic measure of the signal-to-noise-and-interference ratio (SINR) of pilot or reference signals of the respective mobile radio technology which is to be planned or optimized, or an equivalent metric. This is based on the theoretical channel capacity of a channel with a single input and a single output and exhibiting additive white Gaussian noise, described Claude Elwood Shannon: "A Mathematical Theory of Communication", Bell System Technical Journal, vol. 27, p. 379-423, and 623-656, July and October 1948) and known as Shannon capacity: $C_{Shannon}=\mathrm{ld}(1+\mathrm{SINR})$.

In planning and optimizing the configuration of radio access networks it is known to neglect effects arising from so called fast fading. Hence, a channel of a cellular radio technology which do not support multi-antenna installations at the transmitter and/or receiver can generally be described by the scalar value of 'path loss'. Thus, the physical metrics 'coverage' and 'capacity' have so far been calculated from path loss which is determined by means of a channel model. There are, e.g. empirical, statistical, and deterministic channel models.

A minimum request on a channel model is to provide a description of the channel which gives the path loss between the transmitter position and the receiver position as a result. Based on such a radio channel model, a conventional radio access network planning/optimization algorithm typically determines for each transmitter-receiver-combination:

the receive field strength per receiver pixel for an antenna configuration, i.e. one resulting value per receiver pixel and per transmitter; and the SINR per receiver pixel, i.e. one resulting value per receiver pixel and per transmitter.

Necessary information to be input into the radio channel model for planning/optimizing are:

The configuration of a radio access network with multiple base stations, including the positions of the base stations in three-dimensional (3D) space. These base stations might currently be disabled in the radio access network, to form candidate base stations. Such a configuration can be directly imported from (operative) data bases of a network operator.

the transmit power of each of the base stations;

models of the directional characteristic of the antennas used at transmitter and receiver;

the carrier frequency; and the position of the receivers, which is usually provided as a grid matrix with a fixed resolution (of e.g. 10 m×10 m, or 25 m×25 m), with one receiver per pixel Advantageous additional input information for planning and optimizing radio access networks are, but not exclusively:

a (typical) grid matrix with a fixed resolution (of e.g. 10 m×10 m, or 25 m×25 m), comprising, per pixel, classified information about the type of the environment and the buildings, including values of physical characteristics (e.g. additional attenuation as a logarithmic value, average building height of the buildings, in meters, optionally other values) (clutter matrix, height clutter matrix). The characteristics per pixel are usually not attributed individually but classified into a limited number of so called clutter classes;

a DEM (Digital Elevation Matrix), DTM (Digital Terrain Matrix), representing a geographical profile of the area;

a three dimensional (3D) vector data model of the buildings;

traffic matrices, i.e. user distribution, in form of a grid matrix with a fixed resolution (of e.g. 10 m×10 m, or 25 m×25 m) and a number of users or user density per pixel;

economical and technical targets and rules defined by the radio network operator for planning and optimization of the radio access network, such as e.g. a minimum receive field strength, a minimum SINR, a minimum gain through multi-antenna technologies, and the like.

New mobile radio technologies such as WiMAX, HSPA+, or LTE inherently support deployment of multi-antenna types at the transmitter and at the receiver, or require such multi-antenna types as a requisite component of the configuration.

A scenario with deployment of multi-antennas both at the transmitter and at the receiver is commonly referred to as a multi-antenna radio channel, or MIMO (multiple input-multiple output).

A radio channel of these recent mobile radio technologies has generally to be modeled as a multi-antenna radio channel. To support installations of multi-antennas at the transmitter and at the receiver when planning and optimizing radio access networks, and to correctly account for the characteristics and values of the eigenvalues of the multi-antennas-channel matrix when approximating the channel capacity, the model of the radio channel has to be multi-antenna compatible.

The channel capacity of a MIMO channel exhibiting additive white Gaussian noise and without channel knowledge at the transmitter is both a function of the signal-to-noise ratio and of the eigenvalues of the channel matrix, see G. J. Foschini and M. J. Gans, "On Limits of Wireless Communications in a Fading Environment When Using Multiple Antennas", Wireless Personal Communications. Vol. 6, No. 3, March 1998, p. 311-335. According to Foschini, the capacity of a MIMO channel is expressed as $$C_{MIMO,Foschini} = ld\left(\det\left(I + \frac{SINR}{n_t} HH^*\right)\right).$$

where H is the channel impulse response matrix of the MIMO channel.

Therefore, in the MIMO case it no longer suffices to use the SINR for approximating the capacity of a MIMO channel. Rather, the capacity of a MIMO channel is a function of both SINR and the eigenvalues of the channel impulse response matrix.

Depending on the characteristics of the eigenvalues of the multi-antennas channel matrix, such as correlation characteristics, linear independency, a MIMO capacity increase can be achieved by three effects: an increase of the Signal-to-Interference-and-Noise Ratio (SINR) through beam forming, a diversity gain, or spatial multiplexing/cross-polarization multiplexing. As a further challenge, a variety of MIMO antenna types are available including cross-polarized antennas, uniform linear arrays featuring beam forming, and remote radio heads. In terms of MIMO network capacity these antenna types take advantage of different even conflicting radio wave propagation effects.

Thus, in order to select the optimal MIMO antenna type per sector, the MIMO performance of different antenna types in the spatial environment of the sector's position should be analyzed in addition to the classical inspections of the physical metrics coverage and capacity in cellular MIMO network planning and optimization.

In prior art algorithms, the advantages arising from diversity, beam forming and multiplexing, are modeled independently from the actual planning and optimizing algorithm by determining logarithmic metrics (e.g. SINR offsets, presence of multiplexing, and the like) which indirectly represent the characteristics of the eigenvalues. These indirect metrics are then configured, as an input value for the actual planning and optimizing algorithm per clutter class. Shortcomings of this are: The indirect metrics are estimated independently from the actual planning and optimizing algorithm and not calculated by the algorithm itself; and a user of the planning/optimization algorithm has to perform the configuration which is prone to errors, and has to select one advantage per clutter class (not per pixel). This is in sharp contradiction to physical reality according to which the presence and degree of the advantages 'diversity' and 'multiplexing', in particular with multi-antennas at the transmitter and receiver, is a function of the real building density of the environment of transmitter and receiver, and not of clutter classes.

In case a statistical or empirical channel model for estimation of the indirect metrics, in particular in view of multiplexing obtained through deployment of multi-antenna types in radio access networks is used without an exact model of the building density of the environment of transmitter and receiver, its informational outcome for planning and optimization of the configuration of a radio access network is generally questionable, for physical reasons.

What is lacking in the art is a method which allows for direct modeling of the advantages produced by a deployment of multiple antennas at the transmitter and/or receiver instead of a conventional single antenna, in terms of coverage and capacity.

An object of the invention therefore is to provide an estimation of the advantages resulting from a deployment of multi-antennas in radio access networks in terms of coverage and capacity in a self-contained and algorithmically advantageous way. A more specific object of the invention is to provide a method for analyzing the relative performance of different MIMO antenna types in a potential deployment area and for selecting an optimal MIMO antenna type for a particular coverage sector.

SUMMARY OF THE INVENTION

The invention provides a method according to claim 1, for planning and optimizing the configuration of a radio access network. The radio access network comprises base stations and receivers and employs a mobile radio technology that allows and/or enforces use of multi-antenna types at said base stations and receivers, wherein each of said multi-antenna types comprise a plurality of single antenna elements. The method comprises the steps of defining a planning/optimizing area; obtaining a three dimensional model of the environment for said area; obtaining a set of transmitter positions in three-dimensional (3D) space; defining receiver positions in 3D space. According to the invention a scalar metric is determined for each receiver position which metric represents a capacity gain resulting from applying a multi-antenna type or multi-antenna type configuration instead of a single antenna at said transmitter and receiver positions. This scalar metric is determined through a ray tracing algorithm which is performed between the transmitter positions and the receiver positions using the said three dimensional model of the environment for said area. The scalar metric may advantageously be employed to select and then physically deploy an optimum multi-antenna type or multi-antenna configuration in the actual radio access network. The multi-antenna type configuration, here, is defined by the multi-antenna type and a mechanical tilt, electrical tilt, and/or azimuth thereof.

A multi-antenna in conjunction with the present disclosure means an antenna which comprises a plurality of single antenna elements for transmitting or receiving different signals (multiplexing) or the same signals (diversity). Multi-antennas are basically differentiated in multi-antenna types which comprise individual antenna elements that are spatially separated from each other, and multi-antenna types comprising individual antenna elements that are separated by different polarization directions.

Multi-antenna types having spatially separated individual antenna elements are for example equally distributed linear or circular arrays of single antenna elements known as uniform linear arrays (ULA) or uniform circular arrays (UCA) in which individual identical antenna elements are arranged equidistantly spaced from each other with a spacing ranging from fractions of the wavelength up to a few multiples of the wavelength of the transmit or receive carrier frequency.

Also, in conjunction with the present disclosure multi-antennas shall be considered as a multi-antenna type which have its individual antenna elements arranged with a larger spacing than a few multiples of the wavelength of the transmit or receive carrier frequency and which are operated as a multi-antenna, known as remote radio heads (RRH).

A multi-antenna type, comprising individual elements which are separated by different polarization directions, are so called cross-polarized antennas which comprise a pair of co-located single antenna elements having their polarization directions, i.e. orientation of the electrical field, offset by 90 degrees.

Furthermore, combinations of multi-antenna types are known, for example a combination of a linear array of a pair of cross-polarized single antenna elements.

According to a first embodiment, the ray tracing algorithm is performed in an exact 3D model of the environment and rayed are traced until their field strength falls below a defined threshold value based on the algorithms of Geometrical Optics, and optionally such extensions as Uniform Theory of Diffraction and/or models of diffuse scattering to obtain a multi-antenna channel impulse matrix from which a scalar metric is calculated as a ratio of Foschini MIMO capacity to the Shannon capacity of the SISO channel.

According to a second embodiment, a potential multi-antenna type is resolved in the spatial domain by spatial bins which represent an effective activity sector of a single antenna element of the respective multi-antenna type derived from the directional diagram of the multi-antenna type.

For spatially separated single antenna elements, such as a uniform linear array (ULA), uniform circular array (UCA), or remote radio heads (RRH), the ray tracing algorithm is limited to finding propagation paths that include a small number of reflections per path, such as one or two, and dominant and spatially resolvable propagation paths are determined between spatial bins of transmit and receive multi-antennas. The scalar metric for each receiver position is determined by assessing a propagation path matrix the rows of which correspond to the number of single antenna elements of a transmit multi-antenna type and the columns of which correspond to the number of single antenna elements of the receive multi-antenna type at the receiver position, which matrix is populated according to the number of dominant and spatially resolvable propagation paths found. The scalar metric has assigned a first value if at least one row or column in said propagation path matrix is populated by at least two elements, indicating a degree of spatial diversity, and the scalar metric has assigned a second value if at least two rows and at least two columns in said propagation path matrix are populated by at least two elements, indicating a degree of spatial multiplexing.

For single antenna elements which are separated by different polarization directions, such as cross-polarized antennas (XPol), the ray tracing algorithm is limited to a detection of whether there is a line-of-sight relationship between a spatial bin of a transmit and a receive multi-antenna, and the scalar metric has assigned a third value if there is a line-of-sight relationship between a spatial bin of the transmit multi-antenna and a spatial bin of the receive multi-antenna, and has assigned a fourth value if there is no line-of-sight relationship between a spatial bin of the transmit multi-antenna and a spatial bin of the receive multi-antenna.

If the multi-antenna type comprises a combination of spatially separated single antenna elements and single antenna elements separated by different polarization directions, the scalar metric can be determined by a combination of the partial scalar metrics determined for each multi-antenna type.

By the above process of determining dominant and spatially resolvable propagation paths, the estimation of advantages produced by multi-antenna deployment can considerably be accelerated, e.g. to give results within some minutes instead of some hours of computational efforts. This is, because no direct determination of the multi-antenna channel matrix nor a determination of receive power nor of the angles of outgoing and incoming rays is required. Further, it suffices to employ a 3D clutter height matrix as a 3D model of the environment, which is generally available more easily and at lower cost, instead of an exact 3D vector data model of the buildings. In another embodiment, a height threshold can be defined, and ray tracing can be performing separately in both halves of the clutter height matrix above and below said height threshold. This might be used by a network operator for deciding whether to deploy a separate antenna, and the type and orientation thereof, for ensuring network access e.g. in skyscrapers of a city, and then physically deploying the antenna.

Transmitter positions are usually obtained from a network operator, as a set of positions of base stations or sectors of base stations which cover the planning/optimizing area and which are already deployed, but it is equally possible to start planning with a set of candidate positions of optional sites for site selection purposes, or to use a set of existing base station positions together with some candidate positions, for fill-in site planning.

Receiver positions are usually defined in a receiver grid matrix with a fixed resolution and with one receiver per pixels and at a configurable height above ground. In a special embodiment, indoor MIMO performance can be approximated by only considering receiver positions at a distance around buildings of a 3D model of the environment.

The scalar metric can not only be determined for different types of multi-antennas but also for different mechanical tilts, electrical tilts, and/or azimuths of a multi-antenna type. The inventive method may further comprise a step of assessing the scalar metrics determined to select an optimum multi-antenna type, and optionally antenna alignment, per receiver pixel, and per coverage sector, optionally including a weighting of certain receiver pixels in correspondence with a traffic density and/or traffic volume matrix or another economic figure, and then physically deploying the optimum multi-antenna type in the actual radio access network.

The invention provides an algorithmically advantageous method for estimation and optimization of coverage and capacity gains produced by multi-antenna deployments in radio access networks of cellular radio networks.

The inventive method does not require external configurations of potential advantages through multi-antenna installations such as diversity, multiplexing and beamforming, but determines all necessary metrics internally in the algorithm.

The inventive method is also useful for estimating advantages through MIMO in terms of coverage and capacity of future mobile radio technologies, such as network—MIMO, i.e. Cooperative Multipoint (CoMP) technologies like coordinated scheduling/coordinated beamforming and joint transmission/joint reception from/to sectors of the same base station (intra-base station) or sectors of different base stations (inter-base station).

The inventive method can further be used together with the method described in WO 2005/069666 A1—"Method and device for Adapting a Radio network model to the conditions of a real radio network", for improving the scalar metric $Gain_{MIMO}$ reflecting the advantages of multi-antenna types such as diversity, multiplexing, and/or beam forming in terms of their presence and multiplicity per receiver pixel. This can be realized by using pixel-wise existing measuring data or pixel- or grid-wise existing data from a detailed ray launching/tracing simulation in a 3D model of the environment for a subsequent exact calculation of the multi-antenna channel matrix.

BRIEF DESCRIPTION OF THE DRAWINGS

Additional features and advantages of the present invention will be apparent from the following detailed description of specific embodiments which is given by way of example only and in which reference will be made to the accompanying drawings, wherein:

FIG. 1 illustrates an algorithm of simplified ray tracing/path finding according to an embodiment of the invention;

FIG. 2 illustrates defining a clutter height matrix of a planning/optimizing area;

FIG. 3 shows a 3D model of a planning/optimizing area;

FIGS. 5 a, b show a directional diagram of a ULA consisting of 4 single antenna elements, each one being a Hertzian dipole, with a spacing of λ/2, and spatial bins derived therefrom;

FIGS. 9a, b schematically show an example of ray tracing limited to path finding between two multi-antennas of a type illustrated in FIGS. 5a and b, and a propagation path matrix derived therefrom;

FIGS. 12a, b show a flow chart of a first example of antenna type selection, and an exemplary receiver pixel plot resulting therefrom;

FIGS. 13a, b show a flow chart of a second example of antenna type selection, and an exemplary receiver pixel plot resulting therefrom;

FIGS. 14a, b show a flow chart of a third example of antenna type selection, and an exemplary receiver pixel plot resulting therefrom; and FIG. 15 is a simplified schematic view of a best server plot, used for the evaluation of FIGS. 12 to 14.

DETAILED DESCRIPTION OF EXEMPLARY EMBODIMENTS

Figure 4A:
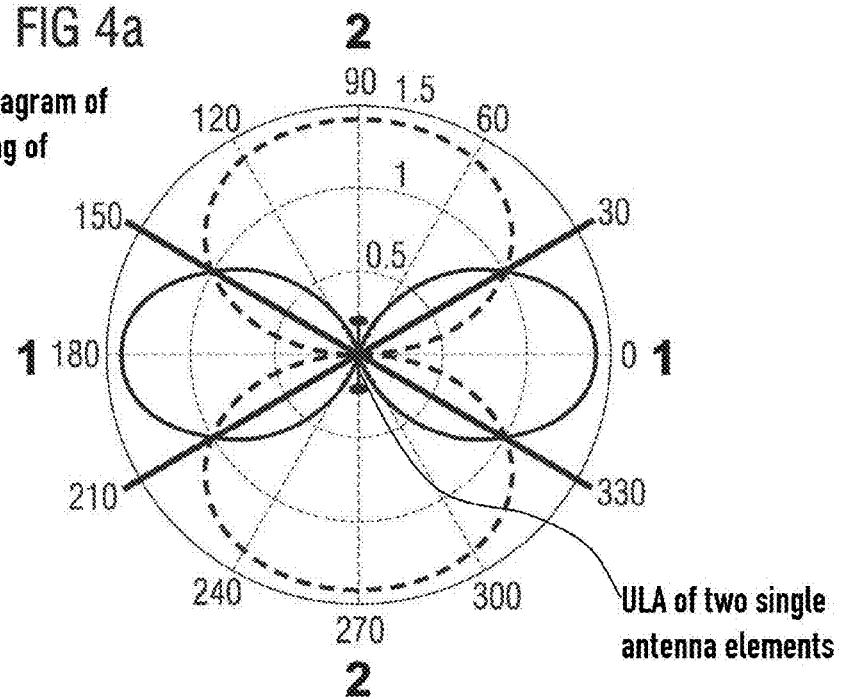
FIGS. 4a, b show a directional diagram of a ULA consisting of 2 single antenna elements, each one being a Hertzian dipole, with a spacing of λ/2, and the spatial bin model derived therefrom.
Figure 4B:
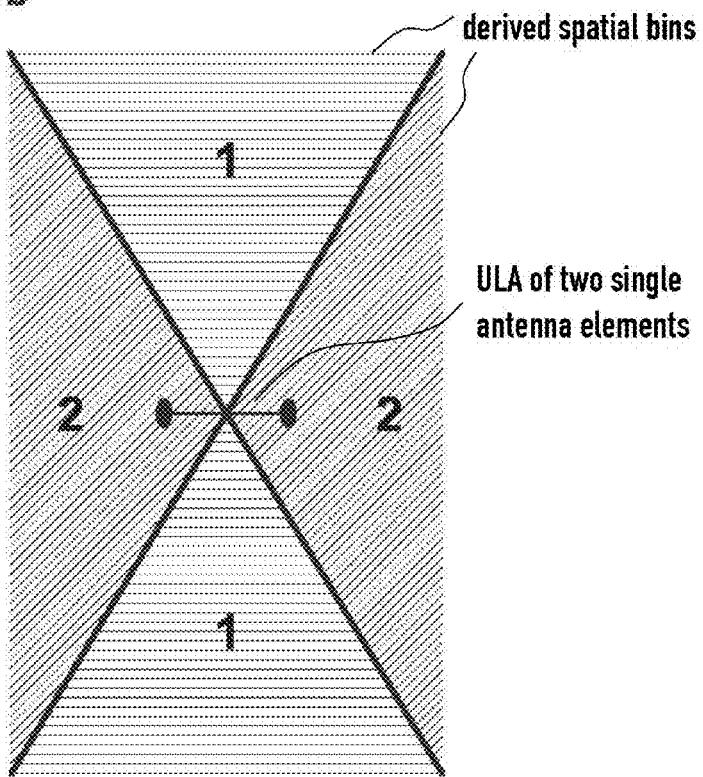

The invention proposes, to use a ray tracing algorithm in a 3D and deterministic model of the environment which incorporates algorithms of Geometrical Optics, and optionally such extensions as Uniform Theory of Diffraction and/or models of diffuse scattering to derive a scalar metric for every receiver pixel which reflects the advantage in terms of coverage and capacity that can be obtained when using multiple antennas instead of single antennas, and using the scalar metric to select and then physically deploy optimum multiple-antenna types and/or configuration in an actual radio access network.

According to a first embodiment is contemplated to use the ratio of MIMO mutual information to the Shannon capacity of the SISO channel as a scalar metric for estimating the advantage in terms of coverage and capacity produced when using multi-antennas instead of single antennas. This scalar metric is expressed as $$GAIN_{MIMO} = \frac{C_{MIMO,Foschini}}{C_{SISO,Shannon}} = \frac{ld\left(\det\left(I_{M_r \times M_r} + \frac{SINR}{M_t} \cdot H_{norm} \cdot H^*_{norm}\right)\right)}{ld(1 + SINR)}, \quad (1)$$

where $H_{norm}$ is the normalized channel impulse response matrix of a respective multi-antenna type which can be derived as follows.

The time-invariant (one sample point) and flat fading (symbol duration>>root mean square delay spread) complex impulse response of a single-input single-output (SISO) radio channel can be described as:

$$\underline{h}^{SISO} = \sum_k a_k \cdot \exp\left(\frac{-j2\pi d_k}{\lambda}\right), \quad (2)$$

wherein:
k—is one path between the transmitter and the receiver,
$d_k$—is the distance between transmitter and receiver on path k, $a_k$—is the complex attenuation on path k, and
$\lambda$—is the carrier wavelength.

This SISO channel impulse response which is a scalar value becomes a matrix in a multi-antenna case, i.e. channel impulse response matrix. The number of rows and columns of this channel matrix is determined by the number of antenna elements at the transmitting and receiving side, respectively. The element in the i-th row and the j-th column of this matrix will be referred to as the (i,j) element of the matrix. While the matrix element at (1,1) in such a channel impulse response matrix can always be determined by expression (1), the calculation of all other channel matrix elements depends on the antenna types used.

FIG. 1 illustrates a ray launching scenario. A bundle of rays emanates from a transmitter source. A 3D model of the environment is accessed to determine the nearest obstacle in the current propagation direction of the ray. The rays are traced over a few reflections or until their field strength falls below a defined threshold value. Once a ray hits an obstacle, the ray launching algorithm includes the radio wave propagation effects reflection, diffraction, and diffuse scattering including de-polarization in its ongoing calculation of k, $d_k$, and $a_k$ (see (2)) based on the algorithms of Geometrical Optics, the Uniform Theory of Diffraction, and, possibly, the Effective Roughness approach.

For exemplary multi-antenna types, channel impulse response can be extended to a multi-antenna channel impulse response matrices can be derived incorporating the underlying propagation effects of these antenna types.

(a) For a Multi-Antenna Type 'Uniform Linear Arrays (ULA) at Transmitter and Receiver':

ULA type antennas consist of multiple equal antenna elements at a uniform distance along a linear array. Typical inter-element distances $\delta=\Delta\lambda$ have a normalized (to the carrier wavelength) antenna separation of $\Delta=0.5$ or $\Delta=1$. Since the distance $d_k$ between the transmitting and receiving antenna arrays is typically much larger than the inter-element distance between the antenna elements, we can apply the plane wave model. In this model the elements of the MIMO channel impulse matrix differ from the element at (1, 1) only by the phase difference between the single antenna elements, i.e. $d_k \approx d_k + \delta = d_k + (m-1)\cdot\Delta\cdot\lambda\cdot\cos(\phi)$, where: m is the antenna element number with $M_r$ being the number of receiver antenna elements and $M_t$ being the number of transmitter antenna elements, $\Delta$ is the inter-element antenna spacing normalized to $\lambda$, and $\phi$ is the angle of the outgoing or incoming plane wave to the direction of the array.

Combining (1) and the above, the multi-antenna channel impulse response matrix of an ULA can be calculated as:

$$\underline{H}^{ULA} = \sum_k \underline{a}_k \cdot e^{\left(\frac{-j2\pi d_k}{\lambda}\right)} \cdot \begin{bmatrix} 1 \\ e^{(-j2\pi\Delta\cos(\phi_{r_k}))} \\ \vdots \\ e^{(-j2\pi\Delta(M_r-1)\cos(\phi_{r_k}))} \end{bmatrix} \begin{bmatrix} 1 \\ e^{(-j2\pi\Delta\cos(\phi_{t_k}))} \\ \vdots \\ e^{(-j2\pi\Delta(M_t-1)\cos(\phi_{t_k}))} \end{bmatrix}^{*}, \quad (3)$$

wherein the superscript * denotes the Hermitian transpose of a complex matrix.

b) For a Multi-Antenna Type 'Cross-Polarized Antennas at Transmitter and Receiver':

A multi-antenna channel with pure XPol antennas is limited to a 2×2 multi-antenna system. Its channel impulse response matrix is thus given by a 2-by-2 matrix which is well known from literature, see e.g. J. P. Kermoal, L. Schumacher, F. Frederiksen, and P. E. Mogensen, "Polarization Diversity in MIMO Radio Channels: Experimental Validation of a Stochastic Model and Performance Assessment", IEEE VTC Fall, Atlantic City, N.J., USA, October 2001:

$$\underline{H}^{XPol} = \begin{bmatrix} \underline{h}^{CoCo} & \underline{h}^{CoCross} \\ \underline{h}^{CrossCo} & \underline{h}^{CrossCross} \end{bmatrix} \quad (4)$$

In (4), each matrix elements reflects the channel impulse response calculated by (2) but for different combinations of the polarization of the transmitting and receiving antenna elements. In a fully polarimetric ray tracing/ray launching algorithm, this MIMO channel impulse response is directly obtained as a result.

(c) For a Multi-Antenna Type 'Combination of RRH (Transmit Antennas), ULA (Receive Antennas)':

RRH types of antennas in this disclosure are intended to be single-element antennas positioned at different locations, e.g. at two corners of a roof. When limiting the MIMO channel to a 2×2 system, i.e. to have two single antenna elements at two different positions at the transmitter (RRH) and a ULA of two elements at the receiver, then, the above described plane-wave model can again be used for the receiving antenna elements. Since we assume the RRH antenna elements at complete different positions thus expecting two de-correlated channel impulse responses, we need to calculate a channel impulse response using (1) for every single RRH antenna element. In this case, the MIMO channel impulse response matrix can be calculated using:

$$\underline{H}^{RRH} = \begin{bmatrix} 1 \\ e^{\left(-j2\pi\Delta\cos\left(\phi_{r_k^{1,2}}^{1,2}\right)\right)} \end{bmatrix} \cdot \begin{bmatrix} \sum_{k^1} \underline{a}_{k^1}^1 \cdot e^{\left(\frac{-j2\pi d_{k^1}^1}{\lambda}\right)} \\ \sum_{k^2} \underline{a}_{k^2}^2 \cdot e^{\left(\frac{-j2\pi d_{k^2}^2}{\lambda}\right)} \end{bmatrix}^T, \quad (5)$$

wherein the superscript 1 or 2 denotes the number of the RRH antenna element, since uncorrelated values for k, $a_k$, $d_k$, and $\phi_{r_k}$ are expected for every single transmitting antenna element at the same receiver position.

From channel impulse matrices (3), (4), and (5), the eigenvalues of the matrix can directly be calculated by algorithms of linear algebra.

Returning to our scalar metric (1), a capacity gain through MIMO by all three effects (beam forming, diversity, or spatial multiplexing) is included. The concrete effect(s) responsible for a $Gain_{MIMO}$ is hidden however in (1).

The lower limit of the $Gain_{MIMO}$ is the value of one: There is no capacity advantage of the MIMO channel compared to the SISO channel. Without beam forming, the upper limit of $Gain_{MIMO}$ is the maximum rank of the channel impulse response matrix (min ($M_r$, $M_t$)) in case of spatial multiplexing, and $M_r$ in case of diversity at low SINR values.

In order to separate the properties of the MIMO channels in terms of its eigenvalues from changes in the SINR we need to apply a normalized channel matrix in the nominator of (1).

This normalization needs to be calculated differently for the applied antenna types as following:

1) ULA and RRH Antenna Types

For these antenna types the channel matrix needs to be normalized to the mean value of all matrix elements, see J. P. Kermoal, L. Schumacher, F. Frederiksen, and P. E. Mogensen, "Polarization Diversity in MIMO Radio Channels: Experimental Validation of a Stochastic Model and Performance Assessment", IEEE VTC Fall, Atlantic City, N.J., USA, October 2001:

$$\underline{H}_{norm} = \frac{H}{\sqrt{\frac{1}{M_r \cdot M_t} \cdot \|H\|_F}} \Leftrightarrow \sum eig(\underline{H} \cdot \underline{H}^*) = M_r \cdot M_t \quad (6)$$

(6) can be applied for both, $\underline{H}^{ULA}$ and $\underline{H}^{RRH}$. In (6), $\|\underline{H}\|_F$ represents the Frobenius norm and eig means eigenvalues.

2) XPol Antenna Types

In case (6) would be applied for XPol antennas, we would not account for the typical high power losses on the cross-polarized sub-channels resulting in an overestimation of the $Gain_{MIMO}$, see V. R. Anreddy and M. A. Ingram, "Capacity of Measured Ricean and Rayleigh Indoor MIMO Channels at 2.5 GHz with Polarization and Spatial Diversity", IEEE WCNC, Las Vegas, Nev., USA, April 2006. We thus normalize the eigenvalues of $H^{Xpol}$ to the SINR of the strongest sub-channel: max $(eig(\underline{H}^{Xpol} \cdot \underline{H}^{XPol*}))$. Then, the capacity of the cross-polarized MIMO channel in (1) is calculated as:

$$C_{MIMO} = \sum ld\left(1 + \frac{SINR}{M_t^{Co}} \cdot \frac{eig(\underline{H}^{XPol} \cdot \underline{H}^{XPol*})}{\max(eig(\underline{H}^{XPol} \cdot \underline{H}^{XPol*}))}\right). \quad (7)$$

In any case, however, the higher our benchmark value, i.e. the value of $Gain_{MIMO}$, for a certain sector's serving area is, the better is the applied antenna type suited to yield a capacity gain by MIMO.

FIG. 2 shows the definition of a clutter height matrix which can advantageously be used as a 3D model of the environment of a planning/optimizing area. Building heights are refracted from a 3D topological database, and an average height per unity area is calculated with a fixed resolution. This will be sufficient for flat areas. In a hilly or mountainous environment however, it would be desirable to correct the building height matrix by a Digital Elevation Matrix (DEM) which represents geological heights of the area. A resulting 3D clutter height matrix from is shown in FIG. 3.

While the first embodiment comprising deterministic calculation of the eigenvalues of a MIMO channel matrix implies some computational complexity and require an exact 3D model of the environment, a second embodiment of the invention proposes to limit the ray launching algorithm to a few reflections, at most three, and to look for dominant paths through the environment represented by a clutter height matrix as shown in FIG. 3.

FIGS. 4 through 8 show examples of a spatial resolution of different multi-antenna types into effective activity sectors for each single antenna element of the respective multi-antenna type.

An spatial resolution of an antenna array into spatially orthogonal units is described e.g. by A. M. Sayeed in "Deconstructing Multi-Antenna Fading Channels", IEEE Transactions on Signal Processing, October 2002, Vol. 50, Issue: 10, p. 2563-2579). An antenna array, here, is to be understood as an arrangement of single antenna elements disposed in a plane or optionally in two perpendicular planes in a 3D Cartesian coordinate system. A single antenna element is defined by any internal construction and by a single external connection to a signal input/output, respectively. In each of these two planes, the number of orthogonal units is defined by the number of individual elements N of the antenna array in the respective plane. The spatial resolution in each plane physically results from the limited size of the array $L=N \Delta$. Here, $\Delta$ is the inter-element antenna spacing normalized to the wavelength $\lambda$ of the carrier frequency. For each of the two planes, for an angle $\phi$ disposed in the plane, and an $$\Omega = \left(0, 1, \ldots, \frac{N-1}{L}\right)$$

a graph in polar coordinates can be determined for determining the spatial bins in this plane by:

$$\left(\phi, \left|\frac{R(\phi) \cdot \sin(\pi \cdot L \cdot (\cos\phi - \Omega))}{N \cdot \sin\left(\frac{\pi \cdot L \cdot (\cos\phi - \Omega)}{N}\right)}\right|\right), \quad (8)$$

wherein $R(\phi)$ is the electric directional diagram of the antenna in this plane.

By dividing the space around the antenna array into spatial bins a simple decomposition of all paths of the signal to be sent or to be received into multi-path components that are resolvable by the antenna array is obtained.

Figure 6A:
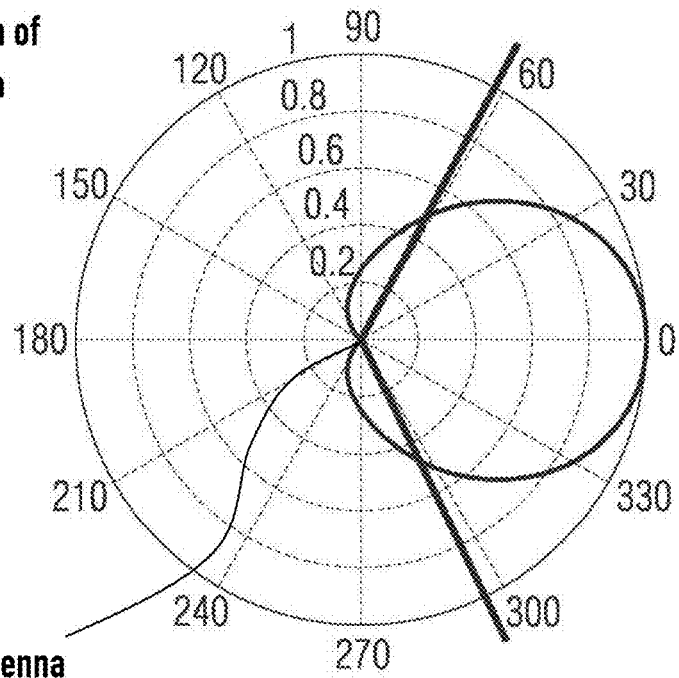
FIGS. 6a, b show a directional diagram of a sector antenna with a 3 dB angle of 65°, and a spatial bin derived therefrom.
Figure 7A:
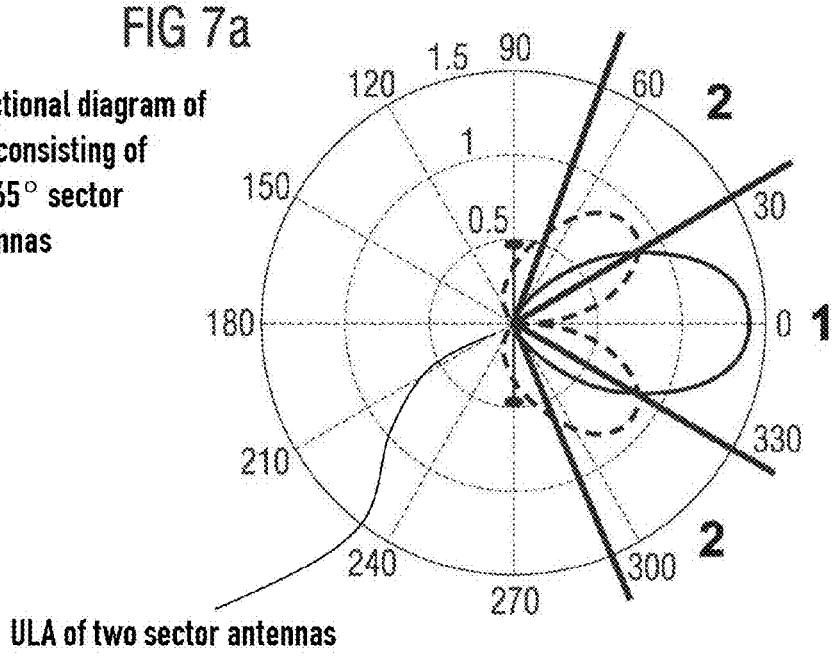
FIGS. 7a, b show a directional diagram of a ULA consisting of 2 single antenna elements, each one being a sector antenna with a 3 dB angle of 65°, with a spacing of λ/2, and spatial bins derived therefrom.

FIGS. 4a,b show a directional diagram of a ULA consisting of 2 single antenna elements, each one being a Hertzian dipole, with a spacing of $\lambda/2$, and the spatial bins derived therefrom; FIGS. 5 a,b show a directional diagram of a ULA consisting of 4 single antenna elements, each one being a Hertzian dipole, with a spacing of $\lambda/2$, and spatial bins derived therefrom; FIGS. 6a,b show a directional diagram of a sector antenna with a 3 dB angle of 65°, and a spatial bin derived therefrom; FIGS. 7a,b show a directional diagram of a ULA consisting of 2 single antenna elements, each one being a sector antenna with a 3 dB angle of 65°, with a spacing of $\lambda/2$, and spatial bins derived therefrom; and FIGS. 8a,b show a directional diagram of a ULA consisting of 4 single antenna elements, each one being a sector antenna with a 3 dB angle of 65°, with a spacing of $\lambda/2$, and spatial bins derived therefrom.

We propose to define the boundaries of the spatial bins as follows:

For a multi-antenna type, comprising a plurality of single antenna elements which are spaced by a distance ranging from a fraction to a few multiples of the wavelength of the transmit or receive carrier frequency (i.e. a ULA or UCA) in a plane or in a pair of perpendicular planes in a 3D Cartesian coordinate system at different coordinates, spatial bins are defined by an acute, and optionally tilted pyramid, the peak of which is arranged at the 3D center of the multi-antenna and the side faces of which are limited in a specified distance from the 3D center position of the multi-antenna as follows: A graph (8) in polar coordinates is generated in each of the pair of perpendicular planes, in which several individual antenna elements are arranged, and the intersecting points of these graphs of the individual spatial units in polar coordinates are used as boundaries of the spatial bins in this plane. In a case where all antenna elements are arranged in a plane at the same coordinate a graph (8) in polar coordinates is generated in this plane, in which several individual antenna elements are arranged, and the intersecting points of these graphs of the individual spatial units in polar coordinates are used as boundaries of the spatial bins in this plane, while in the perpendicular plane the pyramid's apex angle is limited by a fading amount defined in the antenna diagram in this plane relative to the main beam direction of the individual antenna element in this plane. The number of spatial bins hereby is equal to the number of single antenna elements.

For a multi-antenna type, comprising a plurality of single antenna elements which are spaced by a larger distance than a few multiples of the wavelength of the transmit or receive carrier frequency (i.e. RRH) and which are operated as a multi-antenna, and for a multi-antenna, comprising a plurality of single antenna elements which are individual antennas and which are operated in different sectors of a base station, in different base stations at different positions in the 3D environment, and/or in a combination thereof and which are operated as a multi-antenna in the sense of a Cooperative Multipoint (CoMP) (sector and/or network-MIMO), spatial bins are defined by an acute, and optionally tilted pyramid, the peak of which is arranged at the 3D center of the multi-antenna and the side faces of which are limited in a specified distance from the 3D center position of the multi-antenna as follows: In the horizontal direction by a fading amount defined in the horizontal antenna diagram $R(\phi)$ relative to the main beam direction of the individual antenna element in horizontal direction; and in the vertical direction, by a fading amount defined in the vertical antenna diagram $R(\theta)$ relative to the main beam direction of the individual antenna element upwards, and by a fading amount defined in the vertical antenna diagram relative to the main beam direction of the individual antenna element downwards. Here, each one of the single antenna elements is represented by exactly one spatial bin.

For a multi-antenna type, comprising a plurality of single antenna elements which are spaced by different polarization directions (e.g. XPol) spatial bins are defined by an acute, and optionally tilted pyramid, the peak of which is arranged at the 3D center of the multi-antenna and the side faces of which are limited in a specified distance from the 3D center position of the multi-antenna as follows: in the horizontal direction by a fading amount defined in the horizontal antenna diagram $R(\phi)$ relative to the main beam direction of the transmit multi-antenna in horizontal direction; and in the vertical direction, by a fading amount defined in the vertical antenna diagram $R(\theta)$ relative to the main beam direction of the transmit multi-antenna upwards, and by a fading amount defined in the vertical antenna diagram relative to the main beam direction of the transmit multi-antenna downwards.

In a specific embodiment, the spatial bin pyramids can be internally divided into ray tubes the size of which is equally set in horizontal and vertical direction: In this case the ray launching/tracing algorithm includes launching a respective ray through each tube into the 3D model of the environment.

FIG. 9a schematically shows an example of paths found by performing a limited ray tracing algorithm which is limited to finding paths comprising only a small number of reflections (only one reflection in the figure) between the individual spatial bins of two multi-antennas of a type illustrated in FIGS. 5a and b, and FIG. 9b shows a matrix population derived from FIG. 9a.

An orthogonal unit from which a configurable minimum number of paths emanate into or arrive from an environment is referred to as 'populated'. The presence and the multiplicity of the advantage 'spatial multiplexing' in multi-antenna systems and 'diversity' can now simply be determined from the population state of the spatial bins of the transmit and receive antenna arrays. For this, the spatial bins of the transmit and receive antenna arrays are arranged in form of a matrix wherein the spatial bins of the transmit antenna array form the columns of the matrix, and the spatial bins of the receive antenna array form the rows of the matrix. The matrix is populated with paths found between any of the one spatial bins representing the individual antenna elements of transmit and receive antenna arrays. In particular, in FIG. 9a, five dominant paths have been found, from transmitter spatial bin 4 to receiver spatial bins 3 and 4, from transmitter spatial bin 2 to receiver spatial bins 3 and 1, and from transmitter spatial bin 1 to receiver spatial bin 3, as illustrated in the matrix of FIG. 9b.

The presence of advantages through MIMO can be directly derived from this matrix as follows:

reception/transmit diversity: the presence of the fact reception/transmit diversity is seen from population of a row/column with more than one element; the diversity degree corresponds to the number of populated elements per row;

spatial multiplexing: the degree of spatial multiplexing corresponds to a minimum of number of rows and columns populated by more than one element; a presence of spatial multiplexing is determined, if the degree is >1.

Figure 6B:
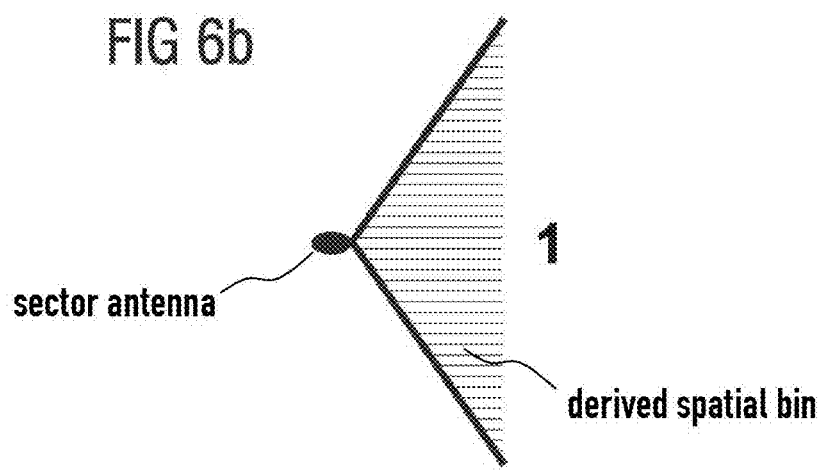
Figure 7B:
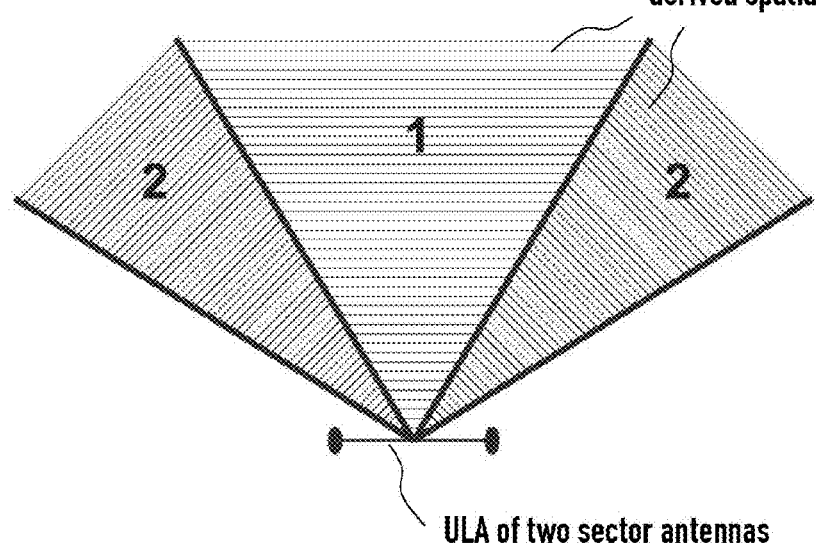
Figure 8A:
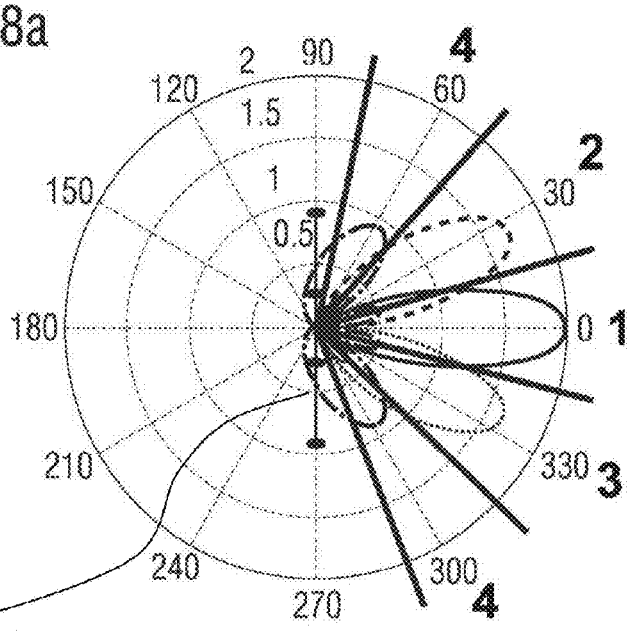
FIGS. 8a, b show a directional diagram of a ULA consisting of 4 single antenna elements, each one being a sector antenna with a 3 dB angle of 65°, with a spacing of λ/2, and spatial bins derived therefrom; (spatial units in polar coordinates and, derived therefrom, orthogonal units in a plane, for an ULA antenna with N=4 and Δ=0.5λ)
Figure 8B:
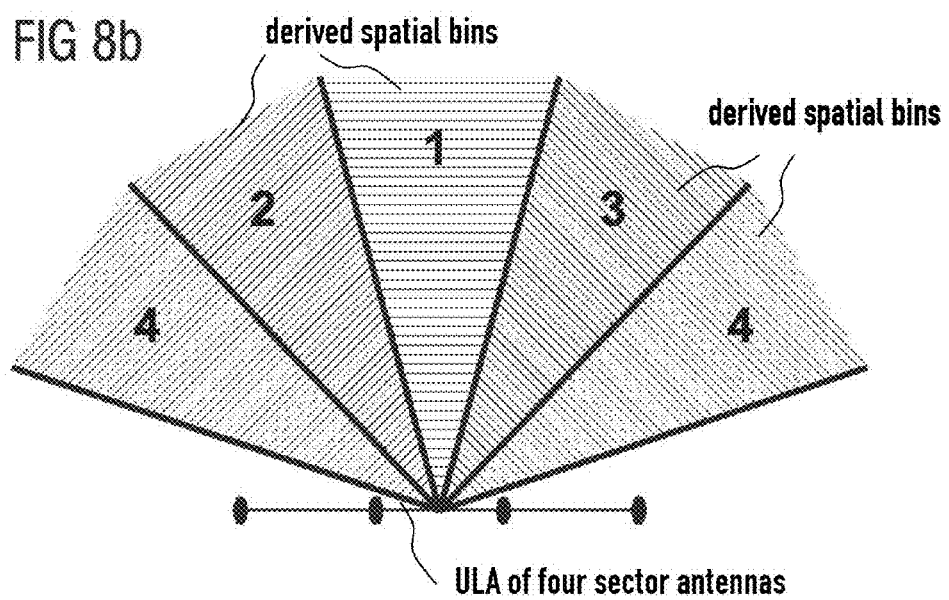
Figure 10:
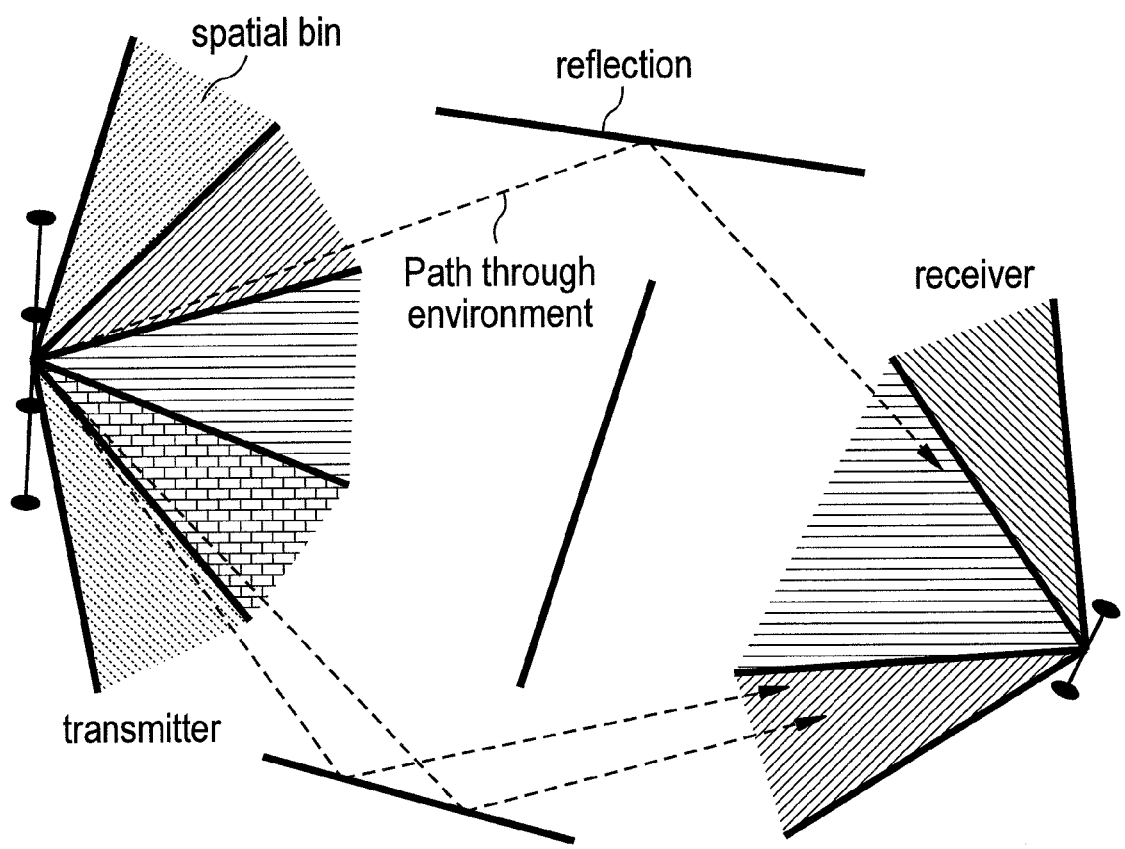
FIG. 10 schematically shows an example of ray tracing limited to path finding between two multi-antennas of a type illustrated in FIGS. 7 and 8, respectively.
Figure 11:
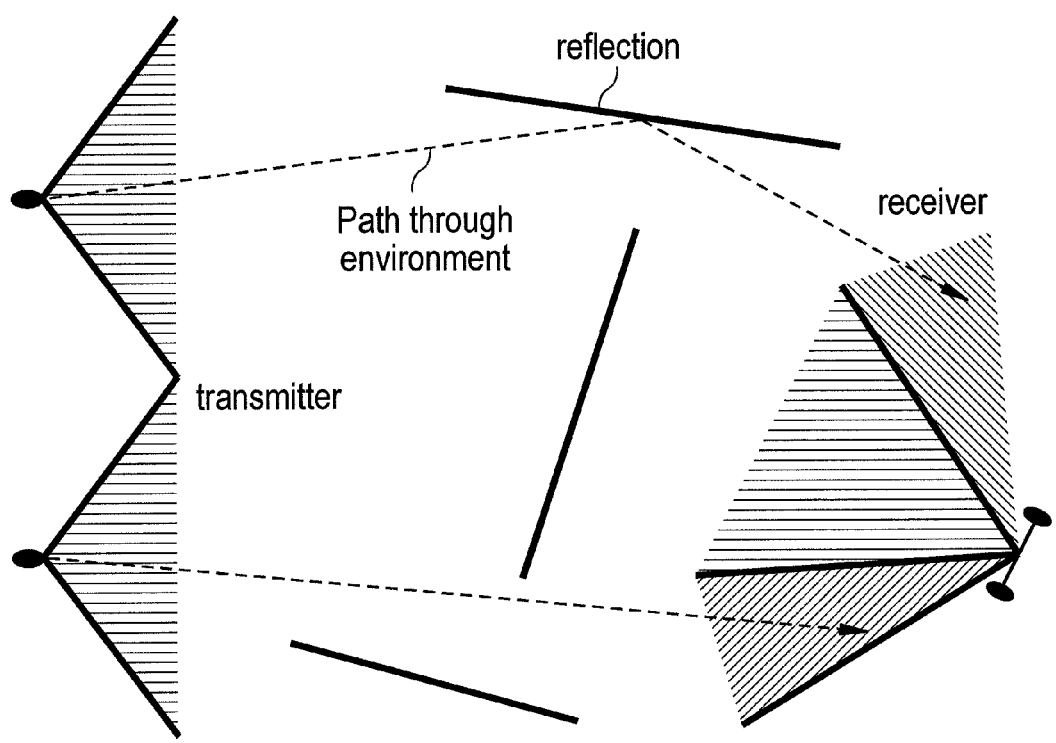
FIG. 11 schematically shows an example of ray tracing limited to path finding between two multi-antennas of a type illustrated in FIGS. 6 and 8, respectively.

FIG. 10 schematically shows an example of ray tracing limited to path finding between two multi-antennas of a type illustrated in FIGS. 7 and 8 (i.e. transmit antenna: 4×ULA with single elements as sector antenna; receive antenna: 2×ULA with single elements as sector antenna), and FIG. 11 schematically shows an example of ray tracing limited to path finding between two multi-antennas of a type illustrated in FIGS. 6 and 8 (transmit antenna: 2 single antennas as sector antenna (Remote Radio Head antenna type) and receive antenna: 2×ULA with single elements as sector antenna), for a ULA antenna with N=2 and $\Delta=0.5\lambda$. Similar matrices as illustrated in FIG. 9b, can be derived for the scenarios of FIGS. 10 and 11.

According to the invention, in the case of multi-antenna types with spatially separated single antenna elements, the scalar metric $Gain_{MIMO}$ has assigned a first value if at least one row or column in said propagation path matrix is populated by at least two elements, indicating a degree of spatial diversity, and said scalar metric has assigned a second value if at least two rows and at least two columns in said propagation path matrix are populated by at least two elements, indicating a degree of spatial multiplexing. Furthermore, according to the invention, in the case of multi-antenna types comprising single antenna elements that are separated by different polarization directions, the scalar metric $Gain_{MIMO}$ has assigned a third value if there is a line-of-sight relationship between a spatial bin of the transmit multi-antenna and a spatial bin of the receive multi-antenna, and has assigned a fourth value if there is no line-of-sight relationship between a spatial bin of the transmit multi-antenna and a spatial bin of the receive multi-antenna. The first, second, third, and/or fourth values can be weighted, if desired, to reflect preference of a specific antenna type in terms of any economic feature defined by the network operator and the like.

FIGS. 12 to 14 show three exemplary embodiments of the step of determining, for each receiver pixel within a coverage sector of the planning/optimizing area, an optimum multi-antenna type. The coverage sectors of a planning/optimizing area are usually derived from a scheme as shown in FIG. 15 and known as "best server plot". Such a best server plot can be obtained by a network operator and illustrates which section of a deployment area is best served in terms of the physical metric 'coverage' by which base station antenna position 15A, B, C. FIGS. 12a, 13a, and 14a each show a flow chart of a decision step for selecting the better antenna type out of two different multi-antenna types using the propagation path matrix described above. FIGS. 12b, 13b, and 14b each show a respective simplified schematic plot which is derived as a result of the evaluation procedure of FIGS. 12a, 13a, and 14a, respectively. The planning/optimizing area is divided into three coverage sectors as shown in FIG. 15. A decision for a best multi-antenna type per receiver pixel is illustrated for only one coverage sector, the receiver pixels in which the respective antenna type performs best being marked with the same pattern as the corresponding antenna type.

FIGS. 12a, b illustrate a decision made between an ULA comprising two single antenna elements and a ULA comprising four single antenna elements, in brief: 2-ULA vs. 4-ULA. If at least one antenna type exhibits the advantage "multiplexing", i.e. the scalar metric $Gain_{MIMO}$ has assigned the second value, the antenna type with the highest spatial multiplexing degree is selected as the optimum multi-antenna type for this receiver pixel. If no antenna type exhibits the advantage "multiplexing" but at least one antenna type exhibits the advantage "diversity", i.e. the scalar metric $Gain_{MIMO}$ has assigned the first value, the antenna type with the highest spatial diversity degree is selected as the optimum multi-antenna type for this receiver pixel. If no antenna type exhibits the advantage "multiplexing" or "diversity", a deployment of a multi-antenna type will not result in any advantage from spatial diversity or multiplexing.

FIGS. 13a, b illustrate a decision made between a ULA type and a cross-polarized antenna type, in brief: ULA vs. XPol. If the scalar metric $Gain_{MIMO}$ for the ULA type has assigned the second value, indicating a spatial multiplexing degree of more than 2, the spatial antenna type with the highest spatial multiplexing degree is selected as the optimum multi-antenna type for this receiver pixel. If the scalar metric $Gain_{MIMO}$ for the ULA type has assigned the second value, indicating a spatial multiplexing degree of 2, and the scalar metric $Gain_{MIMO}$ for the XPol type has assigned the third value indicating a line-of-sight (LOS) relationship, the XPol type is selected as the optimum multi-antenna type for this receiver pixel. If the scalar metric $Gain_{MIMO}$ for the ULA type has assigned the second value, indicating a spatial multiplexing degree of 2, and the scalar metric $Gain_{MIMO}$ for the XPol type has assigned the fourth value indicating a non-line-of-sight (NLOS) relationship, the spatial antenna type is selected as the optimum multi-antenna type for this receiver pixel. If none of the above conditions is true, the XPol type is selected as the optimum multi-antenna type for this receiver pixel.

FIGS. 14a, b illustrate a decision made between a ULA type and a combination of ULA and cross-polarized antenna comprising two cross-polarized antennas that are arranged in a linear array, in brief: ULA vs. 2-(ULA+Xpol). If the scalar metric $Gain_{MIMO}$ for the ULA type has assigned the second value, indicating a spatial multiplexing degree of more than 4, the spatial antenna type with the highest spatial multiplexing degree is selected as the optimum multi-antenna type for this receiver pixel. If the scalar metric $Gain_{MIMO}$ for the ULA type has assigned the second value, indicating a spatial multiplexing degree of 2 or more, and the scalar metric $Gain_{MIMO}$ for the XPol combination type has assigned the third value indicating a line-of-sight (LOS) relationship, the XPol combination type is selected as the optimum multi-antenna type for this receiver pixel. If the scalar metric $Gain_{MIMO}$ for the ULA type has assigned the second value, indicating a spatial multiplexing degree of 2 or more, and the scalar metric $Gain_{MIMO}$ for the XPol combination type has assigned the fourth value indicating a non-line-of-sight (NLOS) relationship, both antenna types produce the same advantage and both antenna types are equally weighted in subsequent evaluation of a best antenna type per sector. If non of the above conditions is true, the XPol combination type is selected as the optimum multi-antenna type for this receiver pixel.

Such a plot is easily assessed in view of what antenna type is best suited as a multi-antenna type at a specific base station site to serve the entire coverage sector. A first possibility is to simply count the receiver pixels preferring a respective antenna type and to select the multi-antenna type which is determined the best multi-antenna type at the majority of receiver grid points of a coverage sector as the optimum multi-antenna type for the best covering transmitter position of each coverage sector.

If desired, the receiver pixels can be weighted, e.g. with a value representing a predicted traffic density and/or traffic volume, and the multi-antenna type for which the weighted sum of the scalar metrics of the receiver grid points is highest can be selected as the optimum multi-antenna type for the best covering transmitter position of each coverage sector.

An exemplary simulation was performed in a cellular network in a dense urban European city. The network has a size of about 2 sq. mi (3.5 km$^2$) and consists of three sites with three sectors each. The sector antennas point towards 60 deg, 180 deg, and 300 deg and are located well above (about 50 m) the average building heights (about 15 m). We use a three-dimensional vector representation as topological database of the environment. The radio wave propagation was simulated by the ray launching channel simulator as described above. Receiver positions were placed in a 10 m×10 m grid (Option 1). In a variation, we placed our receivers in a 10 m distance around buildings only (Option 2) in order to check indoor MIMO performance. This rough model assumes windows at all buildings in a 10 m grid. Since penetration is not modeled in the ray launching tool we can especially investigate the MIMO performance of a situation where radio waves only arrive at the receiver from the side of the building where the window is situated. The receivers are served by four of a total of nine sectors. The height of this receiver grid matrix was defined at $z_{Rx}$=1.5 m (configuration C1), and at $z_{Rx}$=15 m (configuration C2) above the DEM.

At the transmitting side, the model used as single antenna element for all discussed antenna types was a typical commercial antenna with a 3 dB beam width of 65 deg, an electrical down tilt of 6 deg and a gain of 16.57 dBi. At the receiving side the artificial model of an isotropic source with 0 dBi gain was used as model for a single antenna element.

The result of the ray launching simulations is a channel impulse response as represented in (2) for every receiver position. In addition to (2) the ray launching tool also outputs the angles of all outgoing (transmitting side) and incoming (receiving side) rays which are needed for the calculation of (3). Since our ray launching simulator is fully polarimetric, the XPol channel matrix as represented in (4) is also a direct channel simulation result.

In a demonstrating example we compared the performance of ULAs with ΔTx/Rx=0.5 with slanted±45 deg XPol antennas, and we put the best server areas of the four serving sectors in coincidence with the results, to obtain a plot as schematically illustrated in FIG. 13.

The results of this analysis are presented in the table below. The table shows four main columns, each one for one of the four sectors serving the receivers. The selection as to which sector serves which receiver was made based on a best server plot as schematically illustrated in FIG. 14. Further, the table shows for both configurations the percentage [%] of the total number of receiver pixels that are served by a respective sector, and the percentage [%] of the total number of receiver pixels that have a higher metric $Gain_{MIMO}$ for one of the two investigated multi-antenna types.

TABLE coverage areas per sector/per antenna type in [%]

| | Sector 1 (S1) | | Sector 2 (S2) | | Sector 3 (S3) | | Sector 4 (S4) | |
|---|---|---|---|---|---|---|---|---|
| | All area | S1 | All area | S2 | All area | S3 | All area | S4 |
| C1 | 13.7 | 100 | 42.0 | 100 | 32.2 | 100 | 6.4 | 100 |
| XPol | 4.5 | 32.8 | 24.4 | 58.1 | 19.5 | 60.6 | 4.7 | 73.4 |
| ULA | 9.2 | 67.2 | 17.6 | 41.9 | 12.7 | 39.4 | 1.7 | 26.6 |
| C2 | 5.6 | 100 | 35.9 | 100 | 33.9 | 100 | 2.4 | 100 |
| XPol | 3.1 | 55.4 | 26.3 | 73.3 | 26.3 | 77.6 | 1.7 | 70.8 |
| ULA | 2.5 | 44.6 | 9.6 | 26.7 | 7.6 | 22.4 | 0.7 | 29.2 |

For instance in C1, sector 2 has an overall coverage of 42.0% of the complete area. In case sector 2 has an XPol antenna, then 58.1% out of its coverage area have a higher $Gain_{MIMO}$ compared with 41.9% of receivers that would have a higher $Gain_{MIMO}$ in case this sector would have an ULA antenna. Thus, sector 2 should be deployed with an XPol antenna. This is also true for sectors 3 and 4, but not for sector 1. On the other hand, results for Option 2 at $z_{Rx}=15$ m (Configuration 2—C2) indicate the reverse antenna type selection for sector 1, which demonstrates the dependence of $Gain_{MIMO}$ on the receiver height and receiver distribution.

The results of such analyses are advantageously employed in designing, selecting, optimizing and physically deploying multi-antenna units of base stations and receivers of actual radio access networks.

The invention claimed is:

1. A method for planning and optimizing the configuration of a radio access network which comprises base stations and receivers and employs a mobile radio technology that allows and/or enforces use of multi-antenna types at said base stations and receivers, wherein each of said multi-antenna types comprise a plurality of single antenna elements, the method comprising:
   defining a planning/optimizing area;
   obtaining a three dimensional model of the environment for said area;
   obtaining a set of transmitter positions in three-dimensional (3D) space;
   defining receiver positions in 3D space;
   determining, for each receiver position, a scalar metric which represents a capacity gain resulting from applying a multi-antenna type or multi-antenna type configuration instead of a single antenna at said transmitter and receiver positions, by means of a ray tracing algorithm which is performed between said transmitter positions and said receiver positions using said three dimensional model of the environment for said area; wherein for a multi-antenna type comprising spatially separated single antenna elements, said scalar metric for each receiver position is determined by assessing a propagation path matrix, wherein rows of the matrix correspond to number of single antenna elements of a transmit multi-antenna type and columns of the matrix correspond to number of single antenna elements of a receive multi-antenna type at a receiver position, and the matrix is populated with a number of dominant and spatially resolvable propagation paths found by limiting said ray tracing algorithm to finding propagation paths that include a small number of reflections per path between a spatial bin of the transmit multi-antenna and a spatial bin of the receive multi-antenna, each spatial bin representing a spatially resolved effective activity sector of a single antenna element of the respective multi-antenna type derived from a directional diagram of the multi-antenna type, wherein said scalar metric has assigned a first value if at least one row or column in said propagation path matrix is populated by at least two elements, indicating a degree of spatial diversity, and said scalar metric has assigned a second value if at least two rows and at least two columns in said propagation path matrix are populated by at least two elements, indicating a degree of spatial multiplexing; and wherein for a multi-antenna type comprising single antenna elements which are separated by different polarization directions, said scalar metric for each receiver position is determined by detecting in said ray tracing algorithm if there is a line-of-sight relationship between a spatial bin of a transmit multi-antenna and a spatial bin of the receive multi-antenna at said receiver position, each spatial bin representing a spatially resolved effective activity sector of a single antenna element of the respective multi-antenna type derived from a directional diagram of the multi-antenna type, wherein said scalar metric has assigned a third value if there is a line-of-sight relationship between a spatial bin of the transmit multi-antenna and a spatial bin of the receive multi-antenna, and has assigned a fourth value if there is no line-of-sight relationship between a spatial bin of the transmit multi-antenna and a spatial bin of the receive multi-antenna.

2. The method of claim 1, wherein said multi-antenna type configuration is defined by said multi-antenna type and a mechanical tilt, electrical tilt, and/or azimuth thereof.

3. The method of claim 1, wherein for a multi-antenna type which comprises spatially separated single antenna elements, said scalar metric for each receiver position is determined by assessing a propagation path matrix, wherein the rows of the matrix correspond to number of single antenna elements of a transmit multi-antenna type and columns of the matrix correspond to number of single antenna elements of a receive multi-antenna type at a receiver position, and the matrix is populated with a number of dominant and spatially resolvable propagation paths found by limiting said ray tracing algorithm to finding propagation paths that include a small number of reflections per path between a spatial bin of the transmit multi-antenna and a spatial bin of the receive multi-antenna, each spatial bin representing a spatially resolved effective activity sector of a single antenna element of the respective multi-antenna type derived from a directional diagram of the multi-antenna type, wherein said scalar metric has assigned a first value if at least one row or column in said propagation path matrix is populated by at least two elements, indicating a degree of spatial diversity, and said scalar metric has assigned a second value if at least two rows and at least two columns in said propagation path matrix are populated by at least two elements, indicating a degree of spatial multiplexing; and
   for a multi-antenna type which comprises single antenna elements which are separated by different polarization directions, said scalar metric for each receiver position is determined by detecting in said ray tracing algorithm if there is a line-of-sight relationship between a spatial bin of a transmit multi-antenna and a spatial bin of the receive multi-antenna at said receiver position, each spatial bin representing a spatially resolved effective activity sector of a single antenna element of the respective multi-antenna type derived from the directional diagram of the multi-antenna type, wherein said scalar metric has assigned a third value if there is a line-of-sight relationship between a spatial bin of the transmit multi-antenna and a spatial bin of the receive multi-antenna, and has assigned a fourth value if there is no line-of-sight relationship between a spatial bin of the transmit multi-antenna and a spatial bin of the receive multi-antenna and wherein, if the multi-antenna type comprises a combination of spatially separated single antenna elements and single antenna elements separated by different polarization directions, the scalar metric is determined by a combination of partial scalar metrics determined for each multi-antenna type.

4. The method of claim 1, wherein the step of obtaining the 3D model of the environment comprises obtaining a clutter height matrix by defining a grid matrix with a fixed resolution, retrieving data representing building height in said area from a data base, and determining an average building height for each grid pixel.

5. The method of claim 1, wherein the step of obtaining the set of transmitter positions comprises obtaining a set of positions of base stations or sectors of base stations which cover the planning/optimizing area and which are already deployed, from a network operator, for optimizing the network configuration by optimizing the antenna configuration at said set of positions, or comprises defining a set of candidate positions of optional sites for site selection purposes, for planning a radio access network, or a combination thereof, for fill-in site planning.

6. The method of claim 5, wherein optimizing the network configuration comprises determining an antenna configuration for each transmitter position which maximizes at least one of the metrics: coverage, capacity, or MIMO capacity gain, while maintaining minimum requirements for the remaining metrics.

7. The method of claim 1, wherein the step of defining receiver positions comprises defining a receiver grid matrix with a fixed resolution with one receiver per pixels, and a configurable receiver height above ground, for evaluating MIM( ) performance throughout the area, or comprises defining receiver points only at a distance around buildings of a clutter height matrix, for approximating indoor MIMO performance.

8. The method of claim 1, further comprising: dividing the planning/optimizing area into a plurality of coverage sectors with an associated best covering transmitter position, and determining, for each receiver pixel within each coverage sector, an optimum multi-antenna type and/or antenna configuration for said best covering transmitter position by comparing values of the scalar metric determined for different available multi-antenna types and antenna configurations.

9. The method of claim 8, further comprising selecting the multi-antenna type which is determined the best multi-antenna type at the majority of receiver pixels of a coverage sector as the optimum multi-antenna type for the best covering transmitter position of each coverage sector.

10. The method of claim 8, further comprising weighting the scalar metric determined for each receiver pixel with a value representing a predicted traffic density and/or traffic volume or an economic value, and selecting the multi-antenna type for which a weighted sum of the scalar metrics of the receiver pixels is highest as the optimum multi-antenna type for the best covering transmitter position of each coverage sector.

11. The method of claim 3, further comprising: dividing the planning/optimizing area into a plurality of coverage sectors with an associated best covering transmitter position, and determining, for each receiver pixel within each coverage sector, an optimum multi-antenna type and/or antenna configuration for said best covering transmitter position by comparing values of the scalar metric determined for different available multi-antenna types and antenna configurations.

12. The method of claim 11, further comprising selecting the multi-antenna type which is determined the best multi antenna type at a majority of receiver pixels of a coverage sector as the optimum multi-antenna type for the best covering transmitter position of each coverage sector.

13. The method of claim 11, further comprising weighting the scalar metric determined for each receiver pixel with a value representing a predicted traffic density and/or traffic volume or an economic value, and selecting the multi-antenna type for which a weighted sum of the scalar metrics of the receiver pixels is highest as the optimum multi-antenna type for the best covering transmitter position of each coverage sector.

14. The method of claim 1, wherein the spatially separated single antenna elements comprise a uniform linear array (ULA), or a uniform circular array (UCA), or remote radio heads (RRH).

15. The method of claim of claim 1, wherein the single antenna elements which are separated by different polarization directions comprise cross-polarized antennas (XPol).

16. The method of claim 3, wherein the spatially separated single antenna elements, comprise a uniform linear array (ULA), or a uniform circular array (UCA), or remote radio heads (RRH), and wherein the single antenna elements which are separated by different polarization directions comprise cross-polarized antennas (XPol).

17. The method of claim 4, further comprising correcting said average building height value by a value of a digital elevation matrix (DEM) for each grid pixel, or defining a height threshold and separately performing the method for all receiver pixels above and below said height threshold.

18. The method of claim 10, wherein the economic value comprises a maximum predictable cost or revenue.

19. The method of claim 13, wherein the economic value comprises a maximum predictable cost or revenue.

20. The method of claim 1, further comprising: employing the scalar metric to select and then physically deploy an optimum multi-antenna type or multi-antenna configuration in the radio access network.

21. The method of claim 20, wherein the scalar metric is employed to analyze relative performance of different MIMO antenna types in a potential deployment area and to select and then physically deploy an optimal MIMO antenna type for a particular coverage sector.

* * * * *

UNITED STATES PATENT AND TRADEMARK OFFICE
CERTIFICATE OF CORRECTION

PATENT NO. : 8,428,171 B2
APPLICATION NO. : 12/724746
DATED : April 23, 2013
INVENTOR(S) : Fettweis et al.

Page 1 of 1

It is certified that error appears in the above-identified patent and that said Letters Patent is hereby corrected as shown below:

In the Claims

At Column 19, Line 42: Claim 7, Delete "MIM( )" and insert -- MIMO --

Signed and Sealed this
Fourth Day of June, 2013

Teresa Stanek Rea
*Acting Director of the United States Patent and Trademark Office*